US011912960B2

(12) United States Patent
Kieffer et al.

(10) Patent No.: US 11,912,960 B2
(45) Date of Patent: Feb. 27, 2024

(54) EFFICIENT SURFACTANT SYSTEM ON PLASTIC AND ALL TYPES OF WARE

(71) Applicant: ECOLAB USA INC., Saint Paul, MN (US)

(72) Inventors: Janel Marie Kieffer, Saint Paul, MN (US); Terrence P. Everson, Saint Paul, MN (US); James S. Dailey, Grosse Ile, MI (US); Thomas Gessner, Ypsilanti, MI (US); Juergen Tropsch, Ludwigshafen (DE)

(73) Assignee: Ecolab USA Inc., Saint Paul, MN (US)

( * ) Notice: Subject to any disclaimer, the term of this patent is extended or adjusted under 35 U.S.C. 154(b) by 125 days.

(21) Appl. No.: 17/453,798

(22) Filed: Nov. 5, 2021

(65) Prior Publication Data

US 2022/0056369 A1 Feb. 24, 2022

Related U.S. Application Data

(63) Continuation of application No. 16/848,003, filed on Apr. 14, 2020, now Pat. No. 11,198,836, which is a (Continued)

(51) Int. Cl.

*C11D 1/72* (2006.01)
*C11D 1/825* (2006.01)
(Continued)

(52) U.S. Cl.

CPC .......... *C11D 1/825* (2013.01); *A47L 15/0007* (2013.01); *C11D 1/72* (2013.01); *C11D 1/79* (2013.01)

(58) Field of Classification Search

CPC ........................................................ C11D 1/72
(Continued)

(56) References Cited

U.S. PATENT DOCUMENTS

| | | | |
|---|---|---|---|
| 4,426,362 | A | 1/1984 | Copeland et al. |
| 4,492,646 | A | 1/1985 | Welch |

(Continued)

FOREIGN PATENT DOCUMENTS

| | | | |
|---|---|---|---|
| CA | 2431925 | C | 8/2002 |
| DE | 69918694 | T2 | 7/2005 |

(Continued)

OTHER PUBLICATIONS

BASF, “Plurafac LF-221 Alcohol Alkoxylate, Technical Bulletin”, published on Jan. 30, 2002.

(Continued)

*Primary Examiner* — Gregory E Webb
(74) *Attorney, Agent, or Firm* — McKee, Voorhees & Sease, PLC

(57) ABSTRACT

Surfactant systems and compositions incorporating the same are disclosed for use as rinse aids on plastics and other wares. The surfactant systems and compositions include both liquid and solid formulations, along with methods of use for treating plastics and other wares. The surfactant systems and compositions provide synergistic combinations allowing lower actives in composition formulations of the plastic-compatible surfactant systems providing good sheeting, wetting and drying properties.

20 Claims, 12 Drawing Sheets

Related U.S. Application Data continuation of application No. 15/966,172, filed on Apr. 30, 2018, now Pat. No. 10,683,466, which is a continuation of application No. 15/157,124, filed on May 17, 2016, now Pat. No. 9,982,220, and a continuation of application No. 15/157,194, filed on May 17, 2016, now Pat. No. 10,017,714.

(60) Provisional application No. 62/163,454, filed on May 19, 2015.

(51) Int. Cl.
*A47L 15/00* (2006.01)
*C11D 1/79* (2006.01)

(58) Field of Classification Search
USPC .......................................................... 510/340
See application file for complete search history.

(56) References Cited

U.S. PATENT DOCUMENTS

| | | | |
|---|---|---|---|
| 4,618,914 | A | 10/1986 | Sato et al. |
| 4,647,258 | A | 3/1987 | Vassarsch |
| 4,654,161 | A | 3/1987 | Kollmeier et al. |
| 4,687,121 | A | 8/1987 | Copeland |
| 4,690,305 | A | 9/1987 | Copeland |
| RE32,763 | E | 10/1988 | Fernholtz et al. |
| RE32,818 | E | 1/1989 | Fernholtz et al. |
| 4,826,661 | A | 5/1989 | Copeland et al. |
| 4,830,769 | A | 5/1989 | O'Lenick, Jr. et al. |
| 4,830,773 | A | 5/1989 | Olson |
| 5,397,506 | A | 3/1995 | Groth et al. |
| 5,474,698 | A | 12/1995 | Rolando et al. |
| 5,501,815 | A | 3/1996 | Man |
| 5,589,099 | A | 12/1996 | Baum |
| 5,603,776 | A | 2/1997 | Lentsch et al. |
| 5,674,831 | A | 10/1997 | Schulz et al. |
| 5,709,852 | A | 1/1998 | Gopalkrishnan et al. |
| 5,876,514 | A | 3/1999 | Rolando et al. |
| 5,880,089 | A | 3/1999 | Lentsch et al. |
| H1818 | H | 11/1999 | Potgieter et al. |
| 6,258,765 | B1 | 7/2001 | Wei et al. |
| 6,294,515 | B1 | 9/2001 | Baum |
| 6,398,820 | B1 | 6/2002 | Merz et al. |
| 6,530,383 | B1 | 3/2003 | Rogmann et al. |
| 6,537,961 | B1 | 3/2003 | Koch |
| RE38,262 | E | 10/2003 | Rolando et al. |
| 6,838,422 | B2 | 1/2005 | Man et al. |
| 6,866,888 | B2 | 3/2005 | Baker |
| 6,956,019 | B2 | 10/2005 | Lentsch et al. |
| 7,279,455 | B2 | 10/2007 | Kiefer et al. |
| 7,592,301 | B2 | 9/2009 | Smith et al. |
| 7,906,474 | B2 | 3/2011 | Varineau et al. |
| 7,960,333 | B2 | 6/2011 | Kieffer et al. |
| 8,211,851 | B2 | 7/2012 | Kieffer et al. |
| 8,324,147 | B2 | 12/2012 | Kieffer et al. |
| 8,395,118 | B2 | 3/2013 | Kryskowski et al. |
| 8,450,264 | B1 | 5/2013 | Kieffer et al. |
| 8,567,161 | B2 | 10/2013 | Man et al. |
| 8,642,530 | B2 | 2/2014 | Kieffer et al. |
| 8,957,011 | B2 | 2/2015 | Kieffer et al. |
| 9,982,220 | B2 * | 5/2018 | Kieffer .................. C11D 1/825 |
| 10,017,714 | B2 * | 7/2018 | Kieffer .................. C11D 1/825 |
| 10,550,354 | B2 * | 2/2020 | Kieffer ............... A47L 15/0007 |
| 10,683,466 | B2 * | 6/2020 | Kieffer .................. C11D 1/825 |
| 11,155,769 | B2 * | 10/2021 | Ellingson ............ C11D 3/2072 |
| 11,198,836 | B2 * | 12/2021 | Kieffer ............... A47L 15/0007 |
| 11,274,265 | B2 * | 3/2022 | Kieffer ............... A47L 15/0007 |
| 2002/0192340 | A1 | 12/2002 | Swart et al. |
| 2003/0109403 | A1 | 6/2003 | Man et al. |
| 2003/0171243 | A1 | 9/2003 | Kischkel et al. |
| 2004/0033269 | A1 | 2/2004 | Hei et al. |
| 2004/0110657 | A1 | 6/2004 | Strothoff |
| 2004/0157760 | A1 | 8/2004 | Man et al. |
| 2006/0246242 | A1 | 11/2006 | Siegel et al. |
| 2007/0253926 | A1 | 11/2007 | Tadrowski et al. |
| 2008/0293615 | A1 | 11/2008 | Kieffer et al. |
| 2009/0023820 | A1 | 1/2009 | Dailey et al. |
| 2009/0035339 | A1 | 2/2009 | Istvan et al. |
| 2009/0196897 | A1 | 8/2009 | Gladfelter et al. |
| 2010/0009886 | A1 | 1/2010 | Smith et al. |
| 2010/0144581 | A1 | 6/2010 | Nekmard |
| 2010/0292127 | A1 | 11/2010 | Kieffer et al. |
| 2010/0294309 | A1 | 11/2010 | Tropsch |
| 2010/0300044 | A1 | 12/2010 | Man et al. |
| 2011/0039754 | A1 | 2/2011 | DeDominicis et al. |
| 2011/0094044 | A1 | 4/2011 | Shamayeli et al. |
| 2011/0112006 | A1 | 5/2011 | Cobb et al. |
| 2011/0160116 | A1 | 6/2011 | Mckechnie et al. |
| 2011/0247657 | A1 | 10/2011 | Bauer et al. |
| 2011/0277786 | A1 | 11/2011 | Zhu |
| 2011/0319669 | A1 | 12/2011 | Yu et al. |
| 2012/0225805 | A1 | 9/2012 | Kieffer et al. |
| 2013/0172228 | A1 | 7/2013 | Bartelme et al. |
| 2013/0225471 | A1 | 8/2013 | Taneja et al. |
| 2014/0121151 | A1 | 5/2014 | Kieffer |
| 2015/0337149 | A1 | 11/2015 | Wakabayashi et al. |
| 2016/0340612 | A1 | 11/2016 | Kieffer et al. |
| 2016/0340613 | A1 | 11/2016 | Kieffer et al. |
| 2016/0340614 | A1 | 11/2016 | Kieffer et al. |
| 2018/0208876 | A1 | 7/2018 | Man et al. |
| 2018/0245019 | A1 | 8/2018 | Kieffer et al. |
| 2019/0093050 | A1 | 3/2019 | Man et al. |
| 2020/0123467 | A1 | 4/2020 | Kieffer et al. |
| 2021/0071108 | A1 | 3/2021 | Kieffer et al. |
| 2022/0154103 | A1 | 5/2022 | Kieffer et al. |
| 2022/0266263 | A1 | 8/2022 | Michailovski et al. |

FOREIGN PATENT DOCUMENTS

| | | | |
|---|---|---|---|
| EP | 1102834 | B1 | 7/2004 |
| JP | 6505044 | A | 6/1994 |
| JP | 2003336092 | A | 11/2003 |
| JP | 200491686 | A | 3/2004 |
| JP | 200716246 | A | 1/2007 |
| JP | 2009111294 | A | 5/2009 |
| JP | 2010532240 | A | 10/2010 |
| JP | 2011208130 | A | 10/2011 |
| JP | 2012512925 | A | 6/2012 |
| JP | 2012526890 | A | 11/2012 |
| JP | 2014156612 | A | 8/2014 |
| JP | 2014526586 | A | 10/2014 |
| JP | 2015532337 | A | 11/2015 |
| RU | 2632874 | C2 | 10/2017 |
| WO | 3911525 | A1 | 11/1989 |
| WO | 2000008125 | A1 | 2/2000 |
| WO | 0046327 | A1 | 8/2000 |
| WO | 2001083879 | A1 | 11/2001 |
| WO | 2005085321 | A1 | 9/2005 |
| WO | 2008148420 | A1 | 12/2008 |
| WO | 2009026956 | A1 | 3/2009 |
| WO | 2014134826 | A1 | 9/2014 |
| WO | 2016187293 | A1 | 11/2016 |
| WO | 2017035006 | A1 | 3/2017 |

OTHER PUBLICATIONS

DOW Personal Care, Kathon CG, "A Safe, Effective, Globally Approved Preservative for Rinse-Off Products" 9 pages, Jun. 2006.

International Searching Authority "Notification of Transmittal of the International Search Report and the Written Opinion of the International Searching Authority, or the Declaration" issued in connection with International application No. PCT/US2016/033067, 16 pages, dated Aug. 23, 2016.

International Searching Authority "Notification of Transmittal of the International Search Report and the Written Opinion of the International Searching Authority, or the Declaration" issued in connection with International application No. PCT/US2016/033087, 17 pages, dated Aug. 24, 2016.

Ecolab USA Inc., PCT/US2016/033067 filed May 18, 2016, "Written Opinion of the International Preliminary Examining Authority" dated May 18, 2016.

(56) References Cited

OTHER PUBLICATIONS

European Search Report, "Supplementary European Search Report", issued in connection to European Application No. 16797217.3, 6 pages dated Oct. 23, 2018.
Examiner's search strategy and results for U.S. Appl. No. 16/718,870, dated Dec. 29, 2020, 125 pages.

* cited by examiner

EFFICIENT SURFACTANT SYSTEM ON PLASTIC AND ALL TYPES OF WARE

CROSS-REFERENCE TO RELATED APPLICATIONS

This is a Continuation application of U.S. Ser. No. 16/848,003, filed Apr. 14, 2020, which is a Continuation application of U.S. Ser. No. 15/966,172, filed Apr. 30, 2018, now U.S. Pat. No. 10,683,466, issued Jun. 16, 2020, which is a Continuation application of U.S. Ser. No. 15/157,124, filed on May 17, 2016, now U.S. Pat. No. 9,982,220, issued May 29, 2018, which is also a Continuation application of U.S. Ser. No. 15/157,194, filed on May 17, 2016, now U.S. Pat. No. 10,017,714, issued Jul. 10, 2018; all of which claim priority under 35 U.S.C. § 119 to provisional application Ser. No. 62/163,454 filed May 19, 2015. Each of these applications are herein incorporated by reference in their entirety including, without limitation, the specification, claims, and abstract, as well as any figures, tables, or drawings thereof.

FIELD OF THE INVENTION

The invention relates to surfactant systems and compositions incorporating the same, which are particularly suitable for use as rinse aids on plastics and other wares. The invention further relates to methods for cleaning plastics and other wares using liquid or solid compositions incorporating the surfactant systems. In particular, the plastics-compatible surfactant systems can be used in a conventional warewashing machines and provide good sheeting, wetting and drying properties suitable for use as solutions on articles including, for example, cookware, dishware, flatware, glasses, cups, hard surfaces, glass surfaces, vehicle surfaces, etc. The surfactant systems are particularly effective on plastic surfaces and for use in rinse aid applications as they outperform conventional surfactant systems employed on plastics and other wares.

BACKGROUND OF THE INVENTION

Rinsing, wetting and sheeting agents are used in a variety of applications to lower the surface tension of water to allow a solution to wet surfaces more effectively. Wetting agents are included in numerous compositions including, but not limited to, cleaning solutions, antimicrobial solutions, paints, adhesives, and inks. A number of wetting agents are currently known, each having certain advantages and disadvantages. There is an ongoing need for improved wetting agent compositions.

Rinsing agents are commonly used in mechanical warewashing machines including dishwashers which are common in the institutional and household environments. Such automatic warewashing machines clean dishes using two or more cycles which can include initially a wash cycle followed by a rinse cycle, and optionally other cycles, for example, a soak cycle, a pre-wash cycle, a scrape cycle, additional wash cycles, additional rinse cycles, a sanitizing cycle, and/or a drying cycle. Rinse aids or rinsing agents are conventionally used in warewashing applications to promote drying and to prevent the formation of spots on the ware being washed. In order to reduce the formation of spotting, rinse aids have commonly been added to water to form an aqueous rinse that is sprayed on the ware after cleaning is complete. A number of rinse aids are currently known, each having certain advantages and disadvantages. There is an ongoing need for improved rinse aid compositions, namely those suited for use on plastic wares.

Accordingly, it is an objective of the claimed invention to develop efficient surfactant systems for rinse aid applications, including warewashing applications for plastics and other wares.

A further object of the invention is to provide rinse aid surfactant systems providing improved sheeting, wetting and fast drying without spots, particularly for plastics and other wares.

A further object of the invention is to provide a synergistic combination of surfactants to provide the same benefits at low active levels, including surfactant systems suitable for liquid and solid formulations which are suitable for low and high temperature applications.

Other objects, advantages and features of the present invention will become apparent from the following specification taken in conjunction with the accompanying drawings.

BRIEF SUMMARY OF THE INVENTION

In an embodiment, the present invention relates to surfactant systems, compositions employing the surfactant systems and methods of using the same.

In an aspect, a surfactant system suitable for high temperature applications comprises at least one nonionic alcohol alkoxylate according to the following formulas (A or A2): $R^1$—O-$(EO)_{x3}(PO)_{y3}$—H (A), wherein $R^1$ is a straight-chain $C_{10}$-$C_{16}$ alkyl, wherein $x_3$ is from 5 to 8, and wherein $y_3$ is from 2 to 5, or $R^1$—O-$(EO)_{x4}(PO)_{y4}$—H (A2), wherein $R^1$ is a straight-chain $C_{10}$-$C_{16}$ alkyl, wherein $x_4$ is from 4 to 6, and wherein $y_4$ is from 3 to 5, and a nonionic alcohol alkoxylate according to the following formula: $R^2$—O-$(EO)_{x1}$—H (B), wherein $R^2$ is $C_{10}$-$C_{14}$ alkyl with an average of at least 2 branches per residue, and wherein $x_1$ is from 5 to 10. In an aspect, the high temperature surfactant system further comprises a nonionic alcohol alkoxylate according to the following formula: $R^2$—O-$(EO)_{x2}$—H (C), wherein $R^2$ is $C_{10}$-$C_{14}$ alkyl with an average of at least 2 branches per residue, and wherein $x_2$ is from 2 to 4.

In an aspect, a surfactant system suitable for low temperature applications comprises at least one nonionic alcohol alkoxylate according to the following formulas (A or A2, B and D): $R^1$—O-$(EO)_{x3}(PO)_{y3}$—H (A), wherein $R^1$ is a straight-chain $C_{10}$-$C_{16}$ alkyl, wherein $x_3$ is from 5 to 8, and wherein $y_3$ is from 2 to 5, or $R^1$—O-$(EO)_{x4}(PO)_{y4}$—H (A2), wherein $R^1$ is a straight-chain $C_{10}$-$C_{16}$ alkyl, wherein $x_4$ is from 4 to 6, and wherein $y_4$ is from 3 to 5, and a nonionic alcohol alkoxylate according to the following formula: $R^2$—O-$(EO)_{x1}$—H (B), wherein $R^2$ is $C_{10}$-$C_{14}$ alkyl with an average of at least 2 branches per residue, and wherein $x_1$ is from 5 to 10; and a nonionic Guerbet alcohol alkoxylate according to the following formula: $R^7$—O—$(PO)_{y5}(EO)_{x5}(PO)_{y6}$—H (D), wherein $R^7$ is a branched $C_5$-$C_{16}$ Guerbet alcohol, $x_5$ is from 5 to 30, $y_5$ is from 1 to 4, and $y_6$ is from 10 to 20.

In a further aspect, a rinse aid composition preferably suited for a high temperature application of use is provided comprising the surfactant system suitable for high temperature applications comprises at least one nonionic alcohol alkoxylate according to the formulas of Surfactant (A or A2), a nonionic alcohol alkoxylate according to the formulas of Surfactant B, and optionally a nonionic alcohol alkoxylate according to the formulas of Surfactant C along with one of more of the surfactant polymers of formulae D, E, F, G, H, I and/or J, in combination at least one additional functional ingredient. In an aspect, the foam profile of the composition has a foam height of less than 5 inches after 5 minutes using the Glewwe method, and the composition is plastic-compatible providing sheeting, wetting and drying properties. Methods of use of the compositions for rinsing a surface are also provided.

In a further aspect, a rinse aid composition preferably suited for a low temperature application of use is provided comprising the surfactant system suitable for low temperature applications comprises at least one nonionic alcohol alkoxylate according to the formulas of Surfactant (A or A2), a nonionic alcohol alkoxylate according to the formulas of Surfactant B, a Guerbet alcohol alkoxylate according to the formula of Surfactant D along with one of more of the surfactant polymers of formulae C, E, F, G, H, I and/or J, in combination at least one additional functional ingredient. In an aspect, the foam profile of the composition has a foam height of less than 5 inches after 5 minutes using the Glewwe method, and the composition is plastic-compatible providing sheeting, wetting and drying properties. Methods of use of the compositions for rinsing a surface are also provided.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
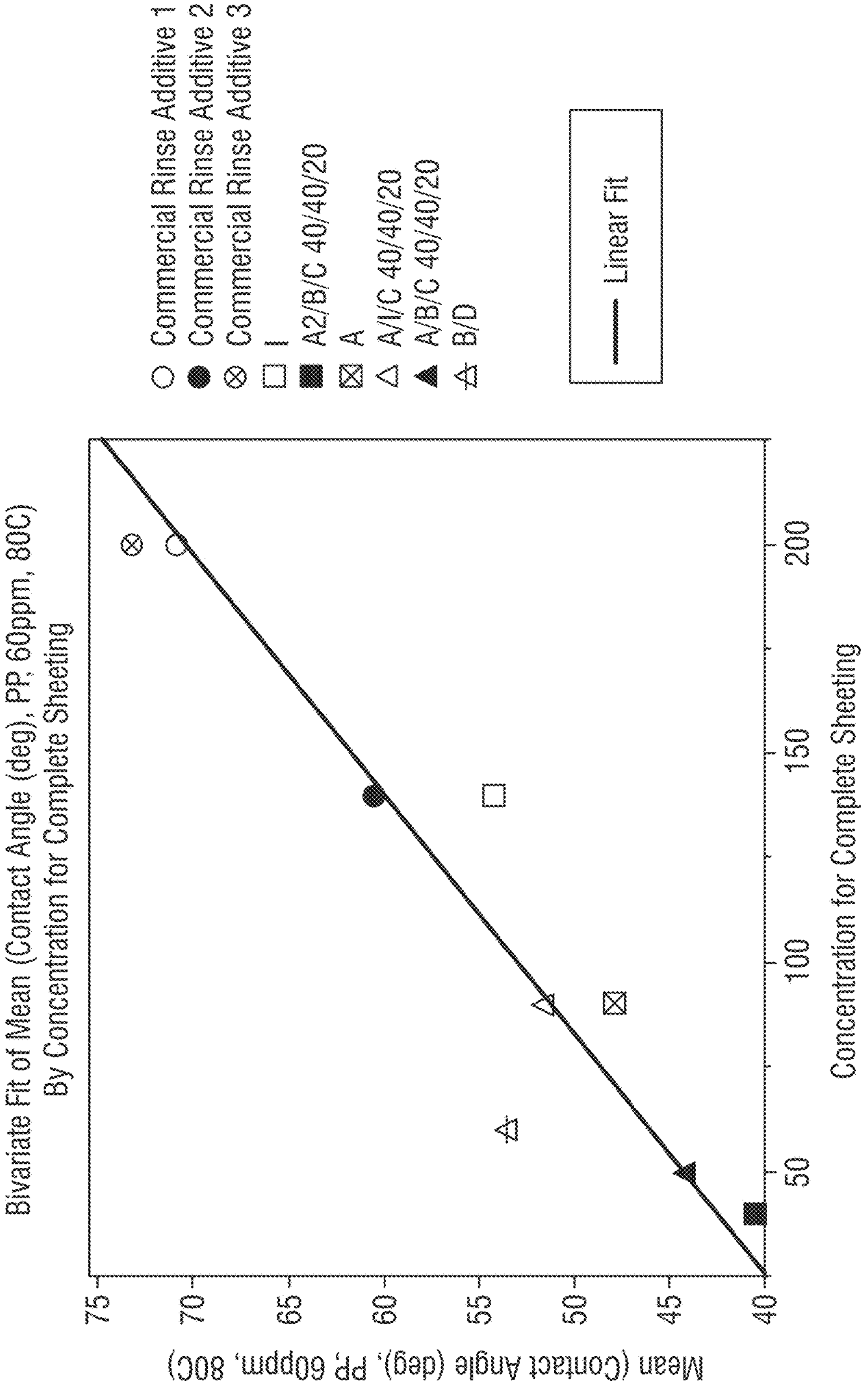
FIG. 1 shows a table depicting the correlation between mean contact angle of a polypropylene substrate surface and concentration of actives required for complete sheeting.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to surfactant systems for various applications, including rinse aid applications and warewashing applications for plastics and other wares. The inventive surfactant systems have many advantages over conventional combinations of surfactants due to improved sheeting, wetting and fast drying, particularly for plastics and other wares.

The embodiments of this invention are not limited to particular applications of use for the inventive surfactant systems, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers within the defined range. Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range (e.g. 1 to 5 includes 1, 1.5, 2, 2.75, 3, 3.80, 4, and 5).

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term "actives" or "percent actives" or "percent by weight actives" or "actives concentration" are used interchangeably herein and refers to the concentration of those ingredients involved in cleaning expressed as a percentage minus inert ingredients such as water or salts.

An "antiredeposition agent" refers to a compound that helps keep suspended in water instead of redepositing onto the object being cleaned. Antiredeposition agents are useful in the present invention to assist in reducing redepositing of the removed soil onto the surface being cleaned.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, autodish sanitizers, sanitizing gels, cooling towers, food processing antimicrobial garment sprays, and non-to-low-aqueous food preparation lubricants, oils, and rinse additives.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces, instruments and the like.

As used herein, the term "phosphorus-free" or "substantially phosphorus-free" refers to a composition, mixture, or ingredient that does not contain phosphorus or a phosphorus-containing compound or to which phosphorus or a phosphorus-containing compound has not been added. Should phosphorus or a phosphorus-containing compound be present through contamination of a phosphorus-free composition, mixture, or ingredients, the amount of phosphorus shall be less than 0.5 wt-%. More preferably, the amount of phosphorus is less than 0.1 wt-%, and most preferably the amount of phosphorus is less than 0.01 wt %. Without being limited according to embodiments of the invention the surfactant systems and/or compositions employing the same may contain phosphates.

As used herein, the term "polymer" generally includes, but is not limited to, homopolymers, copolymers, such as for example, block, graft, random and alternating copolymers, terpolymers, and higher "x" mers, further including their derivatives, combinations, and blends thereof. Furthermore, unless otherwise specifically limited, the term "polymer" shall include all possible isomeric configurations of the molecule, including, but are not limited to isotactic, syndiotactic and random symmetries, and combinations thereof. Furthermore, unless otherwise specifically limited, the term "polymer" shall include all possible geometrical configurations of the molecule.

As used herein, the term "soil" or "stain" refers to a non-polar oily substance which may or may not contain particulate matter such as mineral clays, sand, natural mineral matter, carbon black, graphite, kaolin, environmental dust, etc.

As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "substantially similar cleaning performance" refers generally to achievement by a substitute cleaning product or substitute cleaning system of generally the same degree (or at least not a significantly lesser degree) of cleanliness or with generally the same expenditure (or at least not a significantly lesser expenditure) of effort, or both.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polypropylene polymers (PP), polycarbonate polymers (PC), melamine formaldehyde resins or melamine resin (melamine), acrilonitrile-butadiene-styrene polymers (ABS), and polysulfone polymers (PS). Other exemplary plastics that can be cleaned using the compounds and compositions of the invention include polyethylene terephthalate (PET) and polystyrene polyamide.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The term "parts by weight" and variations thereof, as used herein, refers to the relative weight proportions of a substance within a total weight of the substance in a composition.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Compositions

The compositions according to the invention include at least a surfactant system for use in cleaning plastics and other wares, along with a variety of other hard surfaces in need of a composition providing good sheeting, wetting and drying properties. In some aspects, the present invention provides compositions that can be used as rinse aids which are effective at reducing spotting and filming on a variety of substrates, particularly on plastic ware. In some aspects, the compositions provide enhanced rinsing benefits at a low actives level due to the inventive surfactant systems employed therein. In an aspect the compositions comprise, consist of or consist essentially of a surfactant system disclosed herein. In further aspects, the compositions further include an additional nonionic surfactant and/or additional functional ingredients.

Surfactant Systems

In an aspect, the surfactant system includes at least two alkoxylate surfactants. In an aspect, the surfactant system includes at least two alcohol alkoxylate surfactants. In an aspect, the surfactant system includes three alcohol alkoxylate surfactants. In further aspects, the surfactant systems include a Guerbet alcohol surfactant. Beneficially, the combination of surfactants provides synergy such that reduced actives of the surfactants are required to provide the desired properties of sheeting, wetting and drying. As a further benefit, the surfactant systems include combinations of surfactants having varying degrees of association, providing the beneficial result of reduced or low foam or filming profiles, as the generation of high and/or stable foam is not desirable according to the invention.

Exemplary ranges of the surfactants are shown in Table 1 in parts by weight of the surfactant systems.

TABLE 1

| Surfactant | | Exemplary parts by wt-ranges | | | |
|---|---|---|---|---|---|
| | | 1 | 2 | 3 | 4 |
| Surfactant A and/or | $R^1—O—(EO)_{x3}(PO)_{y3}—H$ | 5-80 | 20-80 | 30-60 | 30-45 |
| Surfactant A2 | $R^1—O—(EO)_{x4}(PO)_{y4}—H$ | 5-80 | 20-80 | 30-60 | 30-45 |
| Surfactant B | $R^2—O—(EO)_{x1}—H$ | 0-80 | 0-60 | 0-50 | 0-40 |
| Surfactant C | $R^2—O—(EO)_{x2}—H$ | 0-80 | 0-60 | 0-40 | 0-20 |
| Surfactant D | $R^7—O—(PO)y_5(EO)x_5(PO)y_6—H$ | 0-80 | 0-60 | 0-40 | 0-20 |
| Surfactant E | $R^6—O—(PO)y_4(EO)x_4—H$ ($R^6$ is $C_8$-$C_{16}$-guerbet) | 0-80 | 0-60 | 0-40 | 0-20 |

In an aspect, the surfactant system includes Surfactant A having the following formula: $R^1—O-(EO)_{x3}(PO)_{y3}—H$, wherein $R^1$ is a straight-chain $C_{10}$-$C_{16}$-alkyl, and wherein $x_3$=5-8, preferably 5.5-7, and wherein $y_3$=2-5, preferably 2-3.5. In an aspect, the surfactant system includes from about 5-80 parts by weight of at least one alkoxylate of the formula $R^1—O-(EO)_{x3}(PO)_{y3}—H$, wherein $R^1$ is a straight-chain $C_{10}$-$C_{16}$-alkyl, and wherein $x_3$=5-8, preferably 5.5-7, and wherein $y_3$=2-5, preferably 2-3.5.

In an aspect, the surfactant system includes Surfactant A2 having the following formula: $R^1—O-(EO)_{x4}(PO)_{y4}—H$, wherein $R^1$ is a straight-chain $C_{10}$-$C_{16}$-alkyl, and wherein $x_4$=4-8, preferably 4-5.5, and wherein $y_4$=2-5, preferably 3.5-5. In an aspect, the surfactant system includes from about 5-80 parts by weight of at least one alkoxylate of the formula $R^1—O-(EO)_{x4}(PO)_{y4}—H$, wherein $R^1$ is a straight-chain $C_{10}$-$C_{16}$-alkyl, and wherein $x_4$=4-8, preferably 4-5.5, and wherein $y_4$=2-5, preferably 3.5-5.

In an aspect, the surfactant system includes Surfactant B has the following formula: $R^2—O-(EO)_{x1}—H$, wherein $R^2$ is a $C_{10}$-$C_{14}$ alkyl, or preferably a $C_{12}$-$C_{14}$ alkyl, with an average at least 1 branch per residue, or preferably at least 2 branches per residue, and wherein $x_1$=5-10. In an aspect, the surfactant system includes from about 0-80 parts by weight of at least one alkoxylate of the formula $R^2—O-(EO)_{x1}—H$, where $R^2$ is a $C_{12}$-$C_{14}$ alkyl with an average at least 2 branches per residue, and wherein $x_1$=5-10, preferably from 5-8.

In an aspect, the surfactant system includes Surfactant C having the following formula: $R^2—O-(EO)_{x2}—H$, wherein $R^2$ is a $C_{10}$-$C_{14}$ alkyl, or preferably a $C_{12}$-$C_{14}$ alkyl with an average at least 1 branch per residue, or preferably at least 2 branches per residue, and wherein $x_2$=2-4. In an aspect, the surfactant system includes from about 0-80 parts by weight of at least one alkoxylate of the formula $R^2—O-(EO)_{x2}—H$, wherein $R^2$ is a $C_{12}$-$C_{14}$ alkyl with in average at least 2 branches per residue, and wherein $x_2$=2-4.

In an aspect, the surfactant system includes Surfactant D having the following formula: $R^7—O—(PO)_{y5}(EO)_{x5}(PO)_{y6}—H$, wherein $R^7$ is a $C_5$-$C_{16}$ Guerbet alcohol, preferably a $C_{8-12}$ Guerbet alcohol, or more preferably a $C_5$-$C_{10}$ Guerbet alcohol, wherein $x_5$=5-30, preferably 9-22, wherein $y_5$=1-5, preferably 1-4, and wherein $y_6$=10-20. In an aspect, the surfactant system includes from about 0-80 parts by weight of a surfactant $R^7—O—(PO)_{y5}(EO)_{x5}(PO)_{y6}—H$, wherein $R^7$ is a $C_8$-$C_{16}$ Guerbet alcohol, wherein $x_5$=5-30, preferably 9-22, wherein $y_5$=1-5, preferably 1-4, and wherein $y_6$=10-20.

In an aspect, the surfactant system includes Surfactant E having the following formula: $R^6—O—(PO)_{y4}(EO)_{x4}—H$, wherein $R^6$ is a $C_5$-$C_{16}$ Guerbet alcohol, preferably a $C_{8-12}$ Guerbet alcohol, or more preferably a $C_5$-$C_{10}$ Guerbet alcohol, wherein $x_4$=2-10, preferably 3-8, wherein $y_4$=1-2. In an aspect, the surfactant system includes from about 0-80 parts by weight of a surfactant $R^6—O—(PO)_{y4}(EO)_{x4}—H$, wherein $R^6$ is a $C_5$-$C_{16}$ Guerbet alcohol, wherein $x_4$=2-10, preferably 3-8, wherein $y_4$=1-2.

In an aspect, the surfactant system comprises, consists of and/or consists essentially:

A surfactant system including at least one of Surfactant A ($R^1—O-(EO)_{x3}(PO)_{y3}—H$) and/or Surfactant A2 ($R^1—O-(EO)_{x4}(PO)_{y4}—H$);

A surfactant system including at least one of Surfactant A ($R^1—O-(EO)_{x3}(PO)_{y3}—H$) and/or Surfactant A2 ($R^1—O-(EO)_{x4}(PO)_{y4}—H$) and Surfactant B ($R^2—O-(EO)_{x1}—H$);

Any combinations of at least two alkoxylate surfactants of the formulas Surfactant A ($R^1—O-(EO)_{x3}(PO)_{y3}—H$) (or Surfactant A2 ($R^1—O-(EO)_{x4}(PO)_{y4}—H$)), Surfactant B ($R^2—O-(EO)_{x1}—H$), Surfactant C($R^2—O-(EO)_{x2}—H$), Surfactant D ($R^7—O—(PO)_{y5}(EO)_{x5}(PO)_{y6}—H$), and/or Surfactant E ($R^6—O—(PO)_{y4}(EO)_{x4}—H$);

Surfactant A ($R^1—O-(EO)_{x3}(PO)_{y3}—H$) (or Surfactant A2 ($R^1—O-(EO)_{x4}(PO)_{y4}—H$)), Surfactant B ($R^2—O-(EO)_{x1}—H$) and Surfactant C($R^2—O-(EO)_{x2}—H$);

Surfactant A ($R^1—O-(EO)_{x3}(PO)_{y3}—H$) (or Surfactant A2 ($R^1—O-(EO)_{x4}(PO)_{y4}—H$)), Surfactant B ($R^2—O-(EO)_{x1}—H$) and Surfactant D ($R^7—O—(PO)_{y5}(EO)_{x5}(PO)_{y6}—H$);

Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H), Surfactant C($R^2$—O-$(EO)_{x2}$—H), and Surfactant E ($R^6$—O—$(PO)_{y4}(EO)_{x4}$—H);

Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H), Surfactant C($R^2$—O-$(EO)_{x2}$—H), and Surfactant D ($R^7$—O—$(PO)_{y5}(EO)_{x5}(PO)_{y6}$—H);

Surfactant A ($R^1$—O-$(EO)_{x3}(PO)_{y3}$—H) (or Surfactant A2 ($R^1$—O-$(EO)_{x4}(PO)_{y4}$—H)), Surfactant D ($R^7$—O—$(PO)_{y5}(EO)_{x5}(PO)_{y6}$—H) and Surfactant G $(EO)_{x6}(PO)_{y7}(EO)_{x6}$;

Surfactant B ($R^2$—O-$(EO)_{x1}$—H), Surfactant C($R^2$—O-$(EO)_{x2}$—H), and Surfactant E ($R^6$—O—$(PO)_{y4}(EO)_{x4}$—H);

Surfactant B ($R^2$—O-$(EO)_{x1}$—H) and/or Surfactant C($R^2$—O-$(EO)_{x2}$—H), Surfactant D ($R^7$—O—$(PO)_{y5}(EO)_{x5}(PO)_{y6}$—H), and Surfactant E ($R^6$—O—$(PO)_{y4}(EO)_{x4}$—H);

Surfactant B ($R^2$—O-$(EO)_{x1}$—H) and/or Surfactant C($R^2$—O-$(EO)_{x2}$—H), and at least one of Surfactant D ($R^7$—O—$(PO)_{y5}(EO)_{x5}(PO)_{y6}$—H), Surfactant E ($R^6$—O—$(PO)_{y4}(EO)_{x4}$—H) and Surfactant A ($R^1$—O-$(EO)_{x3}(PO)_{y3}$—H) (or Surfactant A2 ($R^1$—O-$(EO)_{x4}(PO)_{y4}$—H)); and/or Surfactant D ($R^7$—O—$(PO)_{y5}(EO)_{x5}(PO)_{y6}$—H) and Surfactant E ($R^6$—O—$(PO)_{y4}(EO)_{x4}$—H);

Surfactant B ($R^2$—O-$(EO)_{x1}$—H) and Surfactant E ($R^6$—O—$(PO)_{y4}(EO)_{x4}$—H); and/or Surfactant G $(EO)_{x6}$ $(PO)_{y7}(EO)_{x6}$ in combination with any of the above listed surfactant systems. In particular aspects, a surfactant system for a solid rinse aid composition may preferably include Surfactant G ($(EO)_{x6}$ $(PO)_{y7}(EO)_{x6}$), an EO-PO-EO block copolymer, where $X_6$ is 88-108 and $Y_7$ is 57-77.

In an aspect, in each of the aforementioned surfactant systems, the desired properties of sheeting, wetting and drying are achieved through formulations having desirable contact agent and foam profiles.

Exemplary surfactant systems are shown in Table 2 in parts by weight of the surfactants within the surfactant system are shown as various embodiments as previously set forth above describing exemplary surfactant systems. According to embodiments of the invention, the surfactant systems shown in parts by weight of the surfactants thereof, are diluted by water and/or other process aids to provide a liquid or solid concentrate composition. In a further aspect, the liquid or solid concentrate compositions comprising the surfactant system are further diluted to a use solution.

In an aspect, a surfactant system particularly suited for high temperature rinse aid compositions and applications of use include the combination of Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant C($R^2$—O-$(EO)_{x2}$—H). In a further embodiment Surfactant E ($R^6$—O—$(PO)_{y4}(EO)_{x4}$—H) is excluded from the high temperature rinse aid surfactant system. In a further embodiment, for a solid composition Surfactant G ($(EO)_{x6}$ $(PO)_{y7}(EO)_{x6}$), an EO—PO-EO block copolymer, is included.

In an embodiment, the surfactant system employing Surfactant A (or Surfactant A2)/Surfactant B are employed at a weight ratio of from about 60/40 to about 40/60, or from about 50/50.

In an embodiment, the surfactant system employing Surfactant A (or Surfactant A2)/Surfactant G are employed at a weight ratio of from about 60/40 to about 40/60, or from about 50/50.

In an embodiment, the surfactant system employing Surfactant B/Surfactant G are employed at a weight ratio of from about 60/40 to about 40/60, or from about 50/50.

In an embodiment, the surfactant system employing Surfactant D/Surfactant G are employed at a weight ratio of from about 60/40 to about 40/60, or from about 50/50.

In an embodiment, the surfactant system employing Surfactant A (or Surfactant A2)/Surfactant B/Surfactant C are employed at a weight ratio of from about 30/30/40 to about 45/45/10, or from about 35/35/30 to about 40/40/20.

In a further aspect, a surfactant system particularly suited for low temperature rinse aid compositions and applications of use include the combination of Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant D ($R^7$—O—$(PO)_{y5}(EO)_{x5}(PO)_{y6}$—H). In a further embodiment Surfactant E ($R^6$—O—$(PO)_{y4}(EO)_{x4}$—H) is excluded from the low temperature rinse aid surfactant system.

In a further embodiment, for a solid composition Surfactant G ($(EO)_{x6}$ $(PO)_{y7}(EO)_{x6}$), an EO-PO-EO block copolymer, is included.

In an embodiment, the surfactant system employing Surfactant A (or Surfactant A2)/Surfactant B/Surfactant D are employed at a weight ratio of from about 30/30/40 to about 45/45/10, or from about 35/35/30 to about 40/40/20.

In an aspect, the surfactant systems provide desirable foam profiles as measured according to the Glewwe method wherein after 5 minutes a foam height of 5 inches or less is achieved, preferably less than 5 inches, more preferably 1 to 5 inches, more preferably 1 to 3 inches, and most preferably less than 1 inch of foam.

TABLE 2

| Surfactant | | Exemplary parts by wt-ranges | | | | | | | | | | | |
|---|---|---|---|---|---|---|---|---|---|---|---|---|---|
| | | 5 | 6 | 7 | 8 | 9 | 10 | 11 | 12 | 13 | 14 | 15 | 16 |
| Surfactant A or A2 | $R^1$—O—$(EO)_{x3}(PO)_{y3}$—H | 30-50 | 30-45 | 0 | 0 | 30-45 | 30-45 | 10-20 | 40-60 | 40-60 | 0 | 0 | 0-60 |
| Surfactant B | $R^2$—O—$(EO)_{x1}$—H | 20-50 | 20-50 | 0 | 20-50 | 20-50 | 20-50 | 10-20 | 40-60 | 0 | 40-60 | 0 | 0 |
| Surfactant C | $R^2$—O—$(EO)_{x2}$—H | 0-40 | 15-40 | 20-50 | 0 | 15-40 | 0 | 0 | 0 | 0 | 0 | 0 | 0 |
| Surfactant D | $R^7$—O—$(PO)y_5(EO)x_5(PO)y_6$—H | 0 | 0 | 20-50 | 20-50 | 20-50 | 15-40 | 20-80 | 0 | 0 | 0 | 40-60 | 20-80 |
| Surfactant E | $R^6$—O—$(PO)y_4(EO)x_4$—H | 0 | 0 | 0 | 0 | 20-50 | 0 | 0 | 0 | 0 | 0 | 0 | 0 |
| Surfactant G | $(EO)x_6(PO)y_7(EO)x_6$ | 0-25 | 0-25 | 0-25 | 0-25 | 0-25 | 0-25 | 0-25 | 0 | 40-60 | 40-60 | 40-60 | 5-70 |

In an aspect, the surfactant systems reduce the contact angles of the composition on a substrate surface by between about 5° to about 10°, or preferably between about 5° to about 20°, or more preferably between about 100 to about 250 as compared to the contact angle of a commercially available rinse aid composition, namely a commercially available rinse aid composition not employing the surfactant system combination and ratio of alcohol alkoxylate surfactants. In a preferred aspect, the surfactant systems reduce the contact angles of the composition on a polypropylene surface by between about 5° to about 10°, or preferably between about 5° to about 20°, or more preferably between about 100 to about 250 as compared to the contact angle of a commercially available rinse aid composition. Without wishing to be bound by any particular theory, it is thought that the lower the contact angle, the more a composition will induce sheeting. That is, compositions with lower contact angles will form droplets on a substrate with a larger surface area than compositions with higher contact angles. The increased surface area results in a faster drying time, with fewer spots formed on the substrate.

FIG. 1 shows a bivariate fit of the mean contact angle (degrees) measured on polypropylene (60 ppm, 80° C.) demonstrating the concentration of sheeting agent (ppm) required for complete sheeting on the surface decreases as there is a reduction in the contact angle of the rinse aid composition. Commercial rinse aids are shown in comparison to various alcohol alkoxylate(s) surfactant systems according to embodiments of the invention. As shown, there is a linear fit to the reduction in contact angle of the surfactant system composition or the rinse aid composition employing the surfactant system in comparison to a commercial rinse aid and the reduction in concentration of sheeting agent, illustrating the significant benefit of the invention in providing surfactant systems having a reduced contact angle of between about 5° to about 10°, or preferably between about 5° to about 20°, or more preferably between about 100 to about 250 as compared to the contact angle of a commercially available rinse aid composition, namely a commercially available rinse aid composition that does not employ the surfactant systems according to embodiments of the invention, while also being able to provide such complete sheeting at a low actives level. In some aspects, 125 ppm or less of the surfactant system actives are required for complete sheeting, or 100 ppm or less, or 50 ppm or less.

In some embodiments, the alcohol alkoxylate surfactants of the surfactant systems are selected to have certain environmentally friendly characteristics so they are suitable for use in food service industries and/or the like. For example, the particular alcohol alkoxylate surfactants may meet environmental or food service regulatory requirements, for example, biodegradability requirements.

In an aspect, the surfactant systems and compositions employing the surfactant systems unexpectedly provide efficacy at lower doses, namely use concentrations of about 125 ppm or less of the surfactant system actives, or 100 ppm or less, or 50 ppm or less, due to the synergy of the systems. In an aspect, an actives concentration of less than about 5% provides effective performance. The surfactant system allows dosing at lower actives level while providing at least substantially similar performance, as set forth in further detail in the Examples.

Additional Nonionic Surfactants

In some embodiments, the compositions of the present invention include an additional surfactant combined with the surfactant systems. Surfactants suitable for use with the compositions of the present invention include, but are not limited to, nonionic surfactants. In some embodiments, the surfactant systems of the present invention include about 1 parts by wt of about 75 parts by wt of an additional surfactant. In other embodiments the compositions of the present invention include about 5 parts by wt to about 50 parts by wt of an additional surfactant. In still yet other embodiments, the compositions of the present invention include about 10 parts by wt to about 50 parts by wt of an additional surfactant.

In some embodiments, the rinse aid compositions employing the surfactant system of the present invention include about 1 wt-% to about 75 wt-% of an additional surfactant. In other embodiments the compositions of the present invention include about 5 wt-% to about 50 wt-% of an additional surfactant. In still yet other embodiments, the compositions of the present invention include about 10 wt-% to about 50 wt-% of an additional surfactant.

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

Block polyoxypropylene-polyoxyethylene polymeric compounds based upon propylene glycol, ethylene glycol, glycerol, trimethylolpropane, and ethylenediamine as the initiator reactive hydrogen compound (1). Examples of polymeric compounds made from a sequential propoxylation and ethoxylation of initiator are commercially available from BASF Corp. One class of compounds is difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Another class of compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide (2). The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhone-Poulenc and Triton® manufactured by Union Carbide.

Condensation products of one mole of a saturated or unsaturated, straight or branched chain alcohol having from about 6 to about 24 carbon atoms with from about 3 to about 50 moles of ethylene oxide (3). The alcohol moiety can consist of mixtures of alcohols in the above delineated carbon range or it can consist of an alcohol having a specific number of carbon atoms within this range. Examples of like commercial surfactant are available under the trade names Lutensol™, Dehydol™ manufactured by BASF, Neodol™ manufactured by Shell Chemical Co. and Alfonic™ manufactured by Vista Chemical Co.

Condensation products of one mole of saturated or unsaturated, straight or branched chain carboxylic acid having from about 8 to about 18 carbon atoms with from about 6 to about 50 moles of ethylene oxide (4). The acid moiety can consist of mixtures of acids in the above defined carbon atoms range or it can consist of an acid having a specific number of carbon atoms within the range. Examples of commercial compounds of this chemistry are available on the market under the trade names Disponil or Agnique manufactured by BASF and Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics™ are manufactured by BASF Corporation under the trade name Pluronic™ R surfactants. Likewise, the Tetronic™ R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.

Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include: The alkylphenoxypolyethoxyalkanols of U.S. Pat. No. 2,903,486 issued Sep. 8, 1959 to Brown et al. and represented by the formula

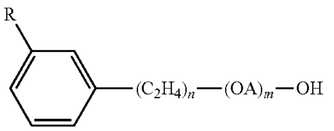

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkylene oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O)_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

Fatty acid amide surfactants suitable for use the present compositions include those having the formula: $R^6CON(R^7)_2$ in which $R^6$ is an alkyl group containing from 7 to 21 carbon atoms and each $R^7$ is independently hydrogen, $C_1$-$C_4$ alkyl, $C_1$-$C_4$ hydroxyalkyl, or —$(C_2H_4O)_xH$, where x is in the range of from 1 to 3.

A useful class of non-ionic surfactants includes the class defined as alkoxylated amines or, most particularly, alcohol alkoxylated/aminated/alkoxylated surfactants. These non-ionic surfactants may be at least in part represented by the general formulae: $R^{20}$—$(PO)_sN$-$(EO)_tH$, $R^{20}$—$(PO)_sN$-$(EO)_tH(EO)_tH$, and $R^{20}$—$N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}$—$(PO)_V$—$N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic™ PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Additional Polymer Surfactants

As set forth regarding additional nonionic surfactants which may be included in compositions containing the inventive surfactant systems. Exemplary additional polymer surfactants preferred for use with the surfactant systems according to the invention are set forth in Table 3.

TABLE 3

| Surfactant | Polymer Surfactant | |
|---|---|---|
| F | $H(OCHCH_2)_x$—O—$(CH_2CH_2O)_y$—$(CH_2CHO)_z$—H<br>$CH_3$ $CH_3$ | Where<br>x = 12-20<br>y = 120-220<br>z = 12-20 |
| G | HO—$(CH_2CH_2O)_x$—O—$(CH_2CHO)_y$—$(CH_2CH_2O)_z$—H<br>$CH_3$ | Where<br>x = 88-108<br>y = 57-77<br>z = 88-108 |
| H | $H(OCHCH_2)_x$—O—$(CH_2CH_2O)_y$—$(CH_2CHO)_z$—H<br>$CH_3$ $CH_3$ | Where<br>x = 15-25<br>y = 10-25<br>z = 15-25 |
| I | $R^4$—O—$(EO)_x(XO)_3$—H | Where<br>R4 = C13-C15 alkyl<br>x = 8-10<br>y = 1-3<br>and XO = Butylene oxide |
| J | $R^5$—O—$(EO)_x(PO)_y$—H | Where<br>R5 = C12-15 alkyl<br>x = 3-5<br>y = 5-7 |

In an aspect, the surfactant system comprises, consists of and/or consists essentially:

- Any combinations of at least two alkoxylate surfactants of the formulas Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H), Surfactant C($R^2$—O-$(EO)_{x2}$—H), Surfactant D ($R^1$—O—$(PO)_{y5}(EO)_{x5}(PO)_{y6}$—H), Surfactant E ($R^6$—O—$(PO)_{y4}(EO)_{x4}$—H), and/or at least one polymer surfactant selected from the group consisting of Surfactants F, G, H, I, J and/or combinations of the same;
- Any combinations of at least two alkoxylate surfactants of the formulas Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H), Surfactant C($R^2$—O-$(EO)_{x2}$—H), Surfactant D ($R^7$—O—$(PO)_{y5}(EO)_{x5}(PO)_{y6}$—H), and/or Surfactant E ($R^6$—O—$(PO)_{y4}(EO)_{x4}$—H), and optionally at least one polymer surfactant selected from the group consisting of Surfactants F, G, H, I, J and/or combinations of the same;
- Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant C($R^2$—O-$(EO)_{x2}$—H), and optionally at least one polymer surfactant selected from the group consisting of Surfactants F, G, H, I, J and/or combinations of the same;
- Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant D ($R^7$—O—$(PO)_{y5}(EO)_{x5}(PO)_{y6}$—H), and optionally at least one polymer surfactant selected from the group consisting of Surfactants F, G, H, I, J and/or combinations of the same;
- Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H), Surfactant C($R^2$—O-$(EO)_{x2}$—H), and Surfactant E ($R^6$—O—$(PO)_{y4}(EO)_{x4}$—H), and optionally at least one polymer surfactant selected from the group consisting of Surfactants F, G, H, I, J and/or combinations of the same;
- Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H), Surfactant C($R^2$—O-$(EO)_{x2}$—H), and Surfactant D ($R^7$—O—$(PO)_{y5}(EO)_{x5}(PO)_{y6}$—H), and optionally at least one polymer surfactant selected from the group consisting of Surfactants F, G, H, I, J and/or combinations of the same;
- Surfactant B ($R^2$—O-$(EO)_{x1}$—H), Surfactant C($R^2$—O-$(EO)_{x2}$—H), and Surfactant E ($R^6$—O—$(PO)_{y4}(EO)_{x4}$—H), and optionally at least one polymer surfactant selected from the group consisting of Surfactants F, G, H, I, J and/or combinations of the same;
- Surfactant B ($R^2$—O-$(EO)_{x1}$—H) and/or Surfactant C($R^2$—O-$(EO)_{x2}$—H), Surfactant D ($R^7$—O—$(PO)_{y5}(EO)_{x5}(PO)_{y6}$—H), and Surfactant E ($R^6$—O—$(PO)_{y4}(EO)_{x4}$—H), and optionally at least one polymer surfactant selected from the group consisting of Surfactants F, G, H, I, J and/or combinations of the same;
- Surfactant B ($R^2$—O-$(EO)_{x1}$—H) and/or Surfactant C($R^2$—O-$(EO)_{x2}$—H), and at least one of Surfactant D ($R^7$—O—$(PO)_{y5}(EO)_{x5}(PO)_{y6}$—H), Surfactant E ($R^6$—O—$(PO)_{y4}(EO)_{x4}$—H) and Surfactant A ($R^1$—O-$(EO)_{x3}(PO)_{y3}$—H) (or Surfactant A2 ($R^1$—O-$(EO)_{x4}(PO)_{y4}$—H)), and optionally at least one polymer surfactant selected from the group consisting of Surfactants F, G, H, I, J and/or combinations of the same;
- Surfactant D ($R^7$—O—$(PO)_{y5}(EO)_{x5}(PO)_{y6}$—H) and Surfactant E ($R^6$—O—$(PO)_{y4}(EO)_{x4}$—H), and optionally at least one polymer surfactant selected from the group consisting of Surfactants F, G, H, I, J and/or combinations of the same;
- Surfactant B ($R^2$—O-$(EO)_{x1}$—H) and Surfactant E ($R^6$—O—$(PO)_{y4}(EO)_{x4}$—H), and optionally at least one polymer surfactant selected from the group consisting of Surfactants F, G, H, I, J and/or combinations of the same.

In an aspect, in each of the aforementioned surfactant systems, the desired properties of sheeting, wetting and drying are achieved through formulations having desirable contact agent and foam profiles.

Surfactant Systems and Compositions Employing Surfactant Systems

Typically, the surfactant systems and compositions employing surfactant systems are formulated into liquid or solid formulations. The surfactant systems and compositions are formulated to include components that are suitable for use in food service industries, e.g., GRAS ingredients, a partial listing is available at 21 CFR 184. In some embodiments, the surfactant systems and compositions are formulated to include only GRAS ingredients. In other embodiments, the surfactant systems and compositions are formulated to include GRAS and biodegradable ingredients.

The surfactant systems and compositions employing the surfactant systems in a use solution preferably have a pH of 8.5 or below, 8.3 or below, or 7 or below.

The surfactant systems and compositions employing the surfactant systems in a use solution preferably have a concentration of about 125 ppm or less of the surfactant system actives, or 100 ppm or less, or 50 ppm or less, due to the synergy of the systems according to the benefits of the invention. The surfactant systems and compositions employing the surfactant systems allow dosing at lower actives level while providing at least substantially similar performance. In an aspect, a rinse aid composition employing the surfactant system particularly suited for high temperature applications includes a surfactant system comprising a combination of Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and optionally Surfactant C ($R^2$—O-$(EO)_{x2}$—H). In an embodiment, the surfactant system employing Surfactant A (or Surfactant A2)/Surfactant B are employed at a weight ratio of from about 60/40 to about 40/60, or from about 50/50. In an embodiment, the surfactant system employing Surfactant A (or Surfactant A2)/Surfactant B/Surfactant C are employed at a weight ratio of from about 30/30/40 to about 45/45/10, or from about 35/35/30 to about 40/40/20.

In a further embodiment Surfactant E ($R^6$—O—$(PO)_{y4}(EO)_{x4}$—H) is excluded from the high temperature rinse aid surfactant system. In a further embodiment, for a solid composition Surfactant G ($(EO)_{x6}$ $(PO)_{y7}(EO)_{x6}$), an EO-PO-EO block copolymer, is included. Each of the additional embodiments of the surfactant systems may further be employed for the rinse aid compositions.

In an aspect, a rinse aid composition employing the surfactant system particularly suited for low temperature rinse aid applications includes a surfactant system comprising a combination of Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant D ($R^7$—O—

$(PO)_{y5}(EO)_{x5}(PO)_{y6}$—H). In an embodiment, the surfactant system employing Surfactant A (or Surfactant A2)/Surfactant B/Surfactant D are employed at a weight ratio of from about 30/30/40 to about 45/45/10, or from about 35/35/30 to about 40/40/20.

In a further embodiment Surfactant E ($R^6$—O—$(PO)_{y4}$ $(EO)_{x4}$—H) is excluded from the low temperature rinse aid surfactant system. In a further embodiment, for a solid composition Surfactant G ($((EO)_{x6}$ $(PO)_{y7}(EO)_{x6})$, an EO-PO-EO block copolymer, is included.

In each aspect of the rinse aid compositions at least one additional functional ingredient is included with the surfactant system. The combination of the surfactant system and the additional functional ingredient(s) provides a foam profile of the composition having a foam height of less than 5 inches after 5 minutes using the Glewwe method. In a further aspect, the combination of the surfactant system and the additional functional ingredient(s) is plastic-compatible providing sheeting, wetting and drying properties which at at least equivalent or superior to a commercially available rinse aid composition at a lower ppm actives of the surfactant system.

Additional Functional Ingredients

The components of the surfactant system composition can further be combined with various functional components suitable for use in rinse aid applications, ware wash applications, and other applications requiring sheeting, wetting, and fast drying of surfaces. In some embodiments, the surfactant system composition including the surfactant system and additional nonionic surfactant make up a large amount, or even substantially all of the total weight of the composition. For example, in some embodiments few or no additional functional ingredients are disposed therein. In other embodiments, additional functional ingredients may be included in the compositions to provide desired properties and functionalities to the compositions. For the purpose of this application, the term “functional ingredient” includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in rinsing and cleaning applications. However, other embodiments may include functional ingredients for use in other applications.

In some embodiments, the compositions do not include a defoaming agent. In other embodiments, the compositions include less than about 30 wt-%, or less than about 20 wt-% defoaming surfactant or defoaming agent, or less than about 10 wt-% defoaming surfactant or defoaming agent, or preferably less than about 5 wt-% defoaming surfactant or defoaming agent to provide an effective amount of defoamer component configured for reducing the stability of foam that may be created by the surfactant system. Exemplary defoaming agents include for example nonionic EO containing surfactants that are hydrophilic and water soluble at relatively low temperatures, for example, temperatures below the temperatures at which the rinse aid will be used. Without being limited to a particular mechanism of action the inclusion of a detergent defoaming agent may negatively interact with the surfactant system as increasing amounts of defoamer demonstrate an antagonist effect of diminished efficacy due to interference with wetting and sheeting in the surfactant systems according to the invention.

In other embodiments, the compositions may include carriers, water conditioning agents including rinse aid polymers, binding agents for solidification, anti-redeposition agents, antimicrobial agents, bleaching agents and/or activators, solubility modifiers, dispersants, rinse aids, metal protecting agents, stabilizing agents, corrosion inhibitors, sequestrants and/or chelating agents, builders, fragrances and/or dyes, humectants, rheology modifiers or thickeners, hardening agents, solidification agents, hydrotropes or couplers, buffers, solvents, pH buffers, cleaning enzymes, carriers, processing aids, solvents for liquid formulations, or others, and the like.

In an exemplary embodiment, a solid rinse aid composition according to the invention comprises from about 10 wt-% to about 80 wt-% surfactant system, from about 10 wt-% to about 80 wt-% solidification aid, from about 0 wt-% to about 10 wt-% water conditioning agent, from about 0 wt-% to about 10 wt-% chelant, from about 0 wt-% to about 20 wt-% acidulant, from about 0 wt-% to about 5 wt-% water, and from about 0 wt-% to about 2 wt-% preservative and/or dye.

In a further exemplary embodiment of a solid rinse aid composition according to the invention comprises from about 10 wt-% to about 65 wt-% surfactant system, from about 20 wt-% to about 60 wt-% solidification aid, from about 0 wt-% to about 8 wt-% water conditioning agent, from about 0 wt-% to about 5 wt-% chelant, from about 0 wt-% to about 15 wt-% acidulant, from about 0 wt-% to about 5 wt-% water, and from about 0 wt-% to about 2 wt-% preservative and/or dye.

In a still further exemplary embodiment of a solid rinse aid composition according to the invention comprises from about 5 wt-% to about 30 wt-% surfactant system, from about 25 wt-% to about 65 wt-% solidification aid, from about 0 wt-% to about 5 wt-% water conditioning agent, from about 0 wt-% to about 3 wt-% chelant, from about 0 wt-% to about 10 wt-% acidulant, from about 0 wt-% to about 5 wt-% water, and from about 0 wt-% to about 2 wt-% preservative and/or dye.

In a still further exemplary embodiment, a liquid rinse aid composition according to the invention comprises from about 2 wt-% to about 90 wt-% surfactant system, from about 0 wt-% to about 40 wt-% coupling agent, from about 0 wt-% to about 10 wt-% water conditioning agent, from about 0 wt-% to about 10 wt-% chelant, from about 0 wt-% to about 15 wt-% acidulant, from about 0 wt-% to about 95 wt-% water, and from about 0 wt-% to about 2 wt-% preservative and/or dye.

In a still further exemplary embodiment, a liquid rinse aid composition according to the invention comprises from about 2 wt-% to about 60 wt-% surfactant system, from about 0 wt-% to about 15 wt-% coupling agent, from about 0 wt-% to about 8 wt-% water conditioning agent, from about 0 wt-% to about 8 wt-% chelant, from about 0 wt-% to about 10 wt-% acidulant, from about 0 wt-% to about 80 wt-% water, and from about 0 wt-% to about 2 wt-% preservative and/or dye.

In a still further exemplary embodiment, a liquid rinse aid composition according to the invention comprises from about 2 wt-% to about 20 wt-% surfactant system, from about 0 wt-% to about 15 wt-% coupling agent, from about 0 wt-% to about 6 wt-% water conditioning agent, from about 0 wt-% to about 6 wt-% chelant, from about 0 wt-% to about 10 wt-% acidulant, from about 0 wt-% to about 80 wt-% water, and from about 0 wt-% to about 2 wt-% preservative and/or dye.

Carriers

In some embodiments, the compositions of the present invention are formulated as liquid compositions. Carriers can be included in such liquid formulations. Any carrier suitable for use in a wetting agent composition can be used in the present invention. For example, in some embodiments the compositions include water as a carrier.

In some embodiments, liquid compositions according to the present invention will contain no more than about 98 wt % water, no more than 95 wt % water, and typically no more than about 90 wt %. In other embodiments, liquid compositions will contain at least 50 wt % water, or at least 60 wt % water as a carrier.

In further embodiments, the compositions may include a coupling agent in an amount in the range of up to about 80 wt-%, up to about 60 wt-%, up to about 40 wt-%, up to about 20 wt-%, up to about 15 wt-%, or up to about 10 wt-%.

Hydrotropes

In some embodiments, the compositions of the present invention can include a hydrotrope. The hydrotrope may be used to aid in maintaining the solubility of sheeting or wetting agents. Hydrotropes can also be used to modify the aqueous solution creating increased solubility for the organic material. In some embodiments, hydrotropes are low molecular weight aromatic sulfonate materials such as xylene sulfonates, dialkyldiphenyl oxide sulfonate materials, and cumene sulfonates.

A hydrotrope or combination of hydrotropes can be present in the compositions at an amount of from between about 1 wt % to about 50 wt %. In other embodiments, a hydrotrope or combination of hydrotropes can be present at about 10 wt % to about 30 wt % of the composition.

Hardening Solidification Agents Solubility Modifiers

In some embodiments, the compositions of the present invention can include a wetting agent and/or hardening agent (or a solidification agent), as for example, an amide such stearic monoethanolamide or lauric diethanolamide, or an alkylamide, and the like; a solid polyethylene glycol, urea, or a solid EO/PO block copolymer, and the like; starches that have been made water-soluble through an acid or alkaline treatment process; various inorganics that impart solidifying properties to a heated composition upon cooling, and the like. Such compounds may also vary the solubility of the composition in an aqueous medium during use such that the wetting agent and/or other active ingredients may be dispensed from the solid composition over an extended period of time.

In some embodiments, a solidification agent includes a short chain alkyl benzene and/or alkyl naphthalene sulfonate, preferably sodium xylene sulfonate (SXS). In some embodiments SXS is employed as a dual purose material in that it acts as a coupler in solution but also as a solidifying agent as a powder.

A hardening agent or solidification agent can include one or more of sodium xylene sulfonate, sodium toluene sulfonate, sodium cumene sulfonate, potassium toluene sulfonate, ammonium xylene sulfonate, calcium xylene sulfonate, sodium alkyl naphthalene sulfonate, and sodium butylnaphthalene sulfonate. In an aspect of the invention, the class of short chain alkyl benzene or alkyl naphthalene hydrotopes includes alkyl benzene sulfonates based on toluene, xylene, and cumene, and alkyl naphthalene sulfonates. Sodium toluene sulfonate and sodium xylene sulfonate are the best known hydrotopes. In a preferred embodiment the solidification agent is SXS.

The compositions may include a solidification aid in an amount in the range of up to about 80 wt-%, from about 10 wt-% to about 80 wt-%, or up to about 50 wt-%. The compositions may include a solubility modifier in the range of about 20 wt-% to about 40 wt-%, or about 5 to about 15 wt-%.

Water Conditioning Agents

In some embodiments, the compositions of the present invention can include a water conditioning agent. Carboxylates such as citrate, tartrate or gluconate are suitable. Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate ($—CO_2—$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed poly acrylamide, hydrolyzed polymethacrylamide, hydrolyzed poly amide-methacrylamide copolymers, hydrolyzed poly acrylonitrile, hydrolyzed polymethacrylonitrile, and hydrolyzed acrylonitrile-methacrylonitrile copolymers. For a further discussion of water conditioning agents, see Kirk-Othmer, Encyclopedia of Chemical Technology, Third Edition, volume 5, pages 339-366 and volume 23, pages 319-320, the disclosure of which is incorporated by reference herein. The compositions may include a water conditioning agent in an amount in the range of up to about 15 wt-%, up to about 10 wt-%, or up to about 5 wt-%.

Acidulants

In some embodiments, the compositions of the present invention can include an acidulant or other pH buffer, and the like. The compositions can be formulated such that during use in aqueous operations, for example in aqueous cleaning operations, the rinse water will have a desired pH. For example, compositions designed for use in rinsing may be formulated such that during use in aqueous rinsing operation the rinse water will have a pH in the range of 8.5 or below, 8.3 or below, or 7 or below. In other aspects, the pH is about 3 to about 5, or in the range of about 5 to about 8.5. Liquid product formulations in some embodiments have a pH in the range of about 2 to about 4, or in the range of about 4 to about 9. Techniques for controlling pH at recommended usage levels include the use of buffers, alkali, acids, etc., and are well known to those skilled in the art. One example of a suitable acid for controlling pH includes citric acid, hydrochloric acid, phosphoric acid, sodium bicarbonate, protonated forms of phosphonates, sodium benzoateand gluconic acid. The compositions may include an acidulant water in an amount in the range of up to about 20 wt-%, up to about 15 wt-%, up to about 10 wt-%, or up to about 5 wt-%.

Chelating/Sequestering Agents

In some embodiments, the compositions of the present invention can include one or more chelating/sequestering agents, which may also be referred to as a builder. A chelating/sequestering agent may include, for example an aminocarboxylic acid, aminocarboxylates and their derivatives, a condensed phosphate, a phosphonate, a polyacrylate, and mixtures and derivatives thereof. In general, a chelating agent is a molecule capable of coordinating (i.e., binding) the metal ions commonly found in natural water to prevent the metal ions from interfering with the action of the other ingredients of a wetting agent or other cleaning composition. The chelating/sequestering agent may also function as a threshold agent when included in an effective amount.

The composition may include a phosphonate such as 1-hydroxyethane-1,1-diphosphonic acid $CH_3C(OH)[PO(OH)_2]_2$; aminotri(methylenephosphonic acid) $N[CH_2PO(OH)_2]_3$; aminotri(methylenephosphonate), sodium salt; 2-hydroxyethyliminobis(methylenephosphonic acid) $HOCH_2CH_2N[CH_2PO(OH)_2]_2$; diethylenetriaminepenta (methylenephosphonic acid) $(HO)_2POCH_2N[CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine (pentamethylenephosphonic acid) $(HO_2)POCH_2N[(CH_2)_6N[CH_2PO(OH)_2]_2]_2$; and phosphorus acid $H_3PO_3$. In some embodiments, a phosphonate combination such as ATMP and DTPMP may be used. A neutralized or alkaline phosphonate, or a combination of the phosphonate with an alkali source prior to being added into the mixture such that there is little or no heat or gas generated by a neutralization reaction when the phosphonate is added can be used. Some examples of polymeric polycarboxylates suitable for use as sequestering agents include those having a pendant carboxylate ($—CO_2$) groups and include, for example, polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, hydrolyzed acrylonitrile-methacrylonitrile copolymers, and the like.

The composition may include an aminocarboxylate or its derivatives, including for example sodium aminocarboxylate under the tradename Trilon A® available from BASF. A biodegradable aminocarboxylate or derivative thereof may also be included in the composition, including for example those available under the tradename Trilon M® available from BASF.

In some embodiments, the compositions can include in the range of up to about 70 wt-%, or in the range of about 0.1 to about 60 wt-%, or about 0.1 to about 5.0 wt-%, of a chelating/sequestering agent. In some embodiments, the compositions of the invention include less than about 1.0 wt-%, or less than about 0.5 wt-% of a chelating/sequestering agent. In other embodiments the compositions may include a chelant/sequestering agent in an amount in the range of up to about 10 wt-%, or up to about 5 wt-%.

Anti-Microbial Sanitizing Agents

In some embodiments, the compositions of the present invention can include an antimicrobial agent. The antimicrobial agent can be provided in a variety of ways. For example, in some embodiments, the antimicrobial agent is included as part of the wetting agent composition. In other embodiments, the antimicrobial agent can be included as a separate component of a composition including the wetting agent composition.

Antimicrobial agents are chemical compositions that can be used in a functional material to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, analides, organosulfur and sulfur-nitrogen compounds and miscellaneous compounds.

In some embodiments, antimicrobial agents suitable for use with the surfactant systems of the present invention include percarboxylic acid compositions or peroxygen compounds, and/or mixtures of diesters. For example, in some embodiments the antimicrobial agent included is at least one of peracetic acid, peroctanoic acid, and mixtures and derivatives thereof. In other embodiments, the sanitizing and/or antimicrobial agent may be a two solvent antimicrobial composition such as the composition disclosed in U.S. Pat. No. 6,927,237, the entire contents of which are hereby incorporated by reference.

In other embodiments, the sanitizing and/or antimicrobial agent may include compositions of mono- or diester dicarboxylates. Suitable mono- or diester dicarboxylates include mono- or dimethyl, mono- or diethyl, mono- or dipropyl (n- or iso), or mono- or dibutyl esters (n-, sec, or tert), or amyl esters (n-, sec-, iso-, or tert-) of malonic, succinic, glutaric, adipic, or sebacic acids, or mixtures thereof. Mixed esters (e.g., monomethyl/monoethyl, or monopropyl/monoethyl) can also be employed. Preferred mono- or diester dicarboxylates are commercially available and soluble in water or another carrier at concentrations effective for antimicrobial activity. Preferred mono- or diester dicarboxylates are toxic to microbes but do not exhibit unacceptable toxicity to humans under formulation or use conditions. Exemplary compositions including mono- or diester dicarboxylates are disclosed in U.S. Pat. No. 7,060,301, the entire contents of which are hereby incorporated by reference.

Some examples of common sanitizing and/or antimicrobial agents include phenolic antimicrobials such as pentachlorophenol, orthophenylphenol, a chloro-p-benzylphenol, p-chloro-m-xylenol. Halogen containing antibacterial agents include sodium trichloroisocyanurate, sodium dichloro isocyanate (anhydrous or dihydrate), iodine-poly (vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties. In some embodiments, the rinse aid compositions are dosed in combination with a sanitizing agent (such as for low temperature applications of use) or further comprise sanitizing agent in an amount effective to provide a desired level of sanitizing.

Additional examples of common sanitizing and/or antimicrobial agents include chlorine-containing compounds such as a chlorine, a hypochlorite, chloramines, of the like.

In some embodiments, an antimicrobial component, can be included in the range of up to about 75% by wt. of the composition, up to about 20 wt. %, in the range of about 1.0 wt % to about 20 wt %, in the range of about 5 wt % to about 10 wt %, in the range of about 0.01 to about 1.0 wt. %, or in the range of 0.05 to 0.05 wt % of the composition.

Bleaching Agents

In some embodiments, the compositions of the present invention can include a bleaching agent. Bleaching agents can be used for lightening or whitening a substrate, and can include bleaching compounds capable of liberating an active halogen species, such as $Cl_2$, $Br_2$, $—OCl^-$ and/or $—OBr^-$, or the like, under conditions typically encountered during the cleansing process. Suitable bleaching agents for use can include, for example, chlorine-containing compounds such as a chlorine, a hypochlorite, chloramines, of the like. Some examples of halogen-releasing compounds include the alkali metal dichloroisocyanurates, chlorinated trisodium phosphate, the alkali metal hypochlorites, monochloramine and dichloroamine, and the like. Encapsulated chlorine sources may also be used to enhance the stability of the chlorine source in the composition.

A bleaching agent may also include an agent containing or acting as a source of active oxygen. The active oxygen compound acts to provide a source of active oxygen, for example, may release active oxygen in aqueous solutions. An active oxygen compound can be inorganic or organic, or can be a mixture thereof. Some examples of active oxygen compound include peroxygen compounds, or peroxygen compound adducts. Some examples of active oxygen compounds or sources include hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine, and the like. A wetting agent composition may include a minor but effective amount of a bleaching agent, for example, in some embodiments, in the range of up to about 10 wt-%, and in some embodiments, in the range of about 0.1 to about 6 wt-%.

Builders or Fillers

In some embodiments, the compositions of the present invention can include a minor but effective amount of one or more of a filler which does not necessarily perform as a rinse and/or cleaning agent per se, but may cooperate with the surfactant systems to enhance the overall capacity of the composition. Some examples of suitable fillers may include sodium sulfate, sodium chloride, starch, sugars, $C_1$-$C_{10}$ alkylene glycols such as propylene glycol, and the like. In some embodiments, a filler can be included in an amount in the range of up to about 20 wt-%, and in some embodiments, in the range of about 1-15 Wt-%.

Anti-Redeposition Agents

In some embodiments, the compositions of the present invention can include an anti-redeposition agent capable of facilitating sustained suspension of soils in a rinse solution and preventing removed soils from being redeposited onto the substrate being rinsed. Some examples of suitable anti-redeposition agents can include fatty acid amides, fluorocarbon surfactants, complex phosphate esters, styrene maleic anhydride copolymers, and cellulosic derivatives such as hydroxyethyl cellulose, hydroxypropyl cellulose, and the like. A wetting agent composition may include up to about 10 wt-%, and in some embodiments, in the range of about 1 to about 5 wt-%, of an anti-redeposition agent.

Dyes Odorants

In some embodiments, the compositions of the present invention can include dyes, odorants including perfumes, and other aesthetic enhancing agents. Dyes may be included to alter the appearance of the composition, as for example, FD&C Blue 1 (Sigma Chemical), FD&C Yellow 5 (Sigma Chemical), Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keyston Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), and the like. Fragrances or perfumes that may be included in the compositions include, for example, terpenoids such as citronellol, aldehydes such as amyl cinnamaldehyde, a jasmine such as CiS-jasmine or jasmal, vanillin, and the like. In other embodiments the compositions may include a preservative and/or dye in an amount in the range of up to about 2 wt-%, or up to about 1 wt-%.

Humectant

The composition can also optionally include one or more humectant. A humectant is a substance having an affinity for water. The humectant can be provided in an amount sufficient to aid in reducing the visibility of a film on the substrate surface. The visibility of a film on substrate surface is a particular concern when the rinse water contains in excess of 200 ppm total dissolved solids. Accordingly, in some embodiments, the humectant is provided in an amount sufficient to reduce the visibility of a film on a substrate surface when the rinse water contains in excess of 200 ppm total dissolved solids compared to a rinse agent composition not containing the humectant. The terms "water solids filming" or "filming" refer to the presence of a visible, continuous layer of matter on a substrate surface that gives the appearance that the substrate surface is not clean.

Some example humectants that can be used include those materials that contain greater than 5 wt. % water (based on dry humectant) equilibrated at 50% relative humidity and room temperature. Exemplary humectants that can be used include glycerin, propylene glycol, sorbitol, alkyl polyglycosides, polybetaine polysiloxanes, and mixtures thereof. In some embodiments, the wetting agent composition can include humectant in an amount in the range of up to about 75% based on the total composition, and in some embodiments, in the range of about 5 wt. % to about 75 wt. % based on the weight of the composition. In some embodiments, where humectant is present, the weight ratio of the humectant to the sheeting agent can be in the range of about 1:3 or greater, and in some embodiments, in the range of about 5:1 and about 1:3.

EMBODIMENTS

The surfactant system compositions of the present invention may include liquid products, thickened liquid products, gelled liquid products, paste, granular and pelletized solid compositions, powders, pressed solid compositions, solid block compositions, cast solid block compositions, extruded solid block composition and others.

Use Solutions

The surfactant system compositions may include concentrate compositions or may be diluted to form use compositions. In general, a concentrate refers to a composition that is intended to be diluted with water to provide a use solution that contacts an object to provide the desired cleaning, rinsing, or the like. The composition that contacts the articles to be washed can be referred to as a concentrate or a use composition (or use solution) dependent upon the formulation employed in methods according to the invention. In an aspect, the surfactant systems in a use solution preferably have a pH of 8.5 or below, 8.3 or below, or 7 or below.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:10 and about 1:10,000 concentrate to water. Particularly, the concentrate is diluted at a ratio of between about 1:100 and about 1:5,000 concentrate to water. More particularly, the concentrate is diluted at a ratio of between about 1:250 and about 1:2,000 concentrate to water.

In an aspect of the invention, the surfactant system composition preferably provides efficacious rinsing at low use dilutions, i.e., require less volume to clean effectively. In an aspect, a concentrated liquid detergent composition may be diluted in water prior to use at dilutions ranging from about 1/16 oz./gal. to about 2 oz./gal. or more. Beneficially the surfactant system concentrate composition according to the invention is efficacious at low actives, such that the composition provides at least substantially similar effects, and preferably improved effects, in comparison to conventional rinsing surfactant systems. In an aspect of the invention, a use solution of the surfactant system composition has between about 1 ppm to about 125 ppm surfactant system, between about 1 ppm to about 100 ppm surfactant system, between about 1 ppm to about 75 ppm surfactant system, between about 1 ppm to about 50 ppm surfactant system, and preferably between about 10 ppm to about 50 ppm surfactant system. In addition, without being limited according to the invention, all ranges recited are inclusive of the numbers defining the range and include each integer within the defined range.

Solid Compositions and Methods of Making the Solids

Various solid compositions can be formulated using the surfactant systems of the present invention, including granular and pelletized solid compositions, powders, solid block compositions, cast solid block compositions, extruded solid block composition and others. By the term "solid", it is meant that the hardened composition will not flow and will substantially retain its shape under moderate stress or pressure or mere gravity. A solid may be in various forms such as a powder, a flake, a granule, a pellet, a tablet, a lozenge, a puck, a briquette, a brick, a solid block, a unit dose, or another solid form known to those of skill in the art. The degree of hardness of the solid cast composition and/or a pressed solid composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly up to approximately 120° F.

The resulting solid composition may take forms including, but not limited to: a cast solid product; an extruded, molded or formed solid pellet, block, tablet, powder, granule, flake; pressed solid; or the formed solid can thereafter be ground or formed into a powder, granule, or flake. In an exemplary embodiment, extruded pellet materials formed by the solidification matrix have a weight of between approximately 50 grams and approximately 250 grams, extruded solids formed by the composition have a weight of approximately 100 grams or greater, and solid block detergents formed by the composition have a mass of between approximately 1 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

Solid particulate materials can be made by merely blending the dry solid ingredients in appropriate ratios or agglomerating the materials in appropriate agglomeration systems. Pelletized materials can be manufactured by compressing the solid granular or agglomerated materials in appropriate pelletizing equipment to result in appropriately sized pelletized materials. Solid block and cast solid block materials can be made by introducing into a container either a prehardened block of material or a castable liquid that hardens into a solid block within a container. Preferred containers include disposable plastic containers or water soluble film containers. Other suitable packaging for the composition includes flexible bags, packets, shrink wrap, and water soluble film such as polyvinyl alcohol.

The solid detergent compositions may be formed using a batch or continuous mixing system. In an exemplary embodiment, a single- or twin-screw extruder is used to combine and mix one or more components at high shear to form a homogeneous mixture. In some embodiments, the processing temperature is at or below the melting temperature of the components. The processed mixture may be dispensed from the mixer by forming, casting or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

In an extrusion process, the liquid and solid components are introduced into final mixing system and are continuously mixed until the components form a substantially homogeneous semi-solid mixture in which the components are distributed throughout its mass. The mixture is then discharged from the mixing system into, or through, a die or other shaping means. The product is then packaged. In an exemplary embodiment, the formed composition begins to harden to a solid form in between approximately 1 minute and approximately 3 hours. Particularly, the formed composition begins to harden to a solid form in between approximately 1 minute and approximately 2 hours. More particularly, the formed composition begins to harden to a solid form in between approximately 1 minute and approximately 20 minutes.

In a casting process, the liquid and solid components are introduced into the final mixing system and are continuously mixed until the components form a substantially homogeneous liquid mixture in which the components are distributed throughout its mass. In an exemplary embodiment, the components are mixed in the mixing system for at least approximately 60 seconds. Once the mixing is complete, the product is transferred to a packaging container where solidification takes place. In an exemplary embodiment, the cast composition begins to harden to a solid form in between approximately 1 minute and approximately 3 hours. Particularly, the cast composition begins to harden to a solid form in between approximately 1 minute and approximately 2 hours. More particularly, the cast composition begins to harden to a solid form in between approximately 1 minute and approximately 20 minutes.

In a pressed solid process, a flowable solid, such as granular solids or other particle solids including the surfactant systems and binding agents (e.g. hydrated chelating agent, such as a hydrated aminocarboxylate, a hydrated polycarboxylate or hydrated anionic polymer, a hydrated citrate salt or a hydrated tartrate salt, or the like together with an alkali metal carbonate, such as disclosed in U.S. Pat. Nos. 8,894,897 and 8,894,898, which are herein incorporated by reference in its entirety) are combined under pressure. The surfactant systems are particularly well suited for use in pressed solid compositions due to the lower liquid amounts to be included as a result of the synergy afforded by the formulation of the surfactant systems requiring lower actives (i.e. less surfactant that other rinse aid surfactant compositions). According to a non-limiting example, a pressed solid according to the surfactant systems of the present invention includes substantially less liquid (e.g. less than 30%, 10-30%, less than 20%, 10-20%, 5-20%, less than 10%, 5-10%, or less than 5%) in comparison to a conventional block solid surfactant system would require between about 50-70% liquid.

In a pressed solid process, flowable solids of the compositions are placed into a form (e.g., a mold or container). The method can include gently pressing the flowable solid in the form to produce the solid cleaning composition. Pressure may be applied by a block machine or a turntable press, or the like. Pressure may be applied at about 1 to about 2000 psi, about 1 to about 300 psi, about 5 psi to about 200 psi, or about 10 psi to about 100 psi. In certain embodiments, the methods can employ pressures as low as greater than or equal to about 1 psi, greater than or equal to about 2, greater than or equal to about 5 psi, or greater than or equal to about 10 psi. As used herein, the term "psi" or "pounds per square inch" refers to the actual pressure applied to the flowable solid being pressed and does not refer to the gauge or hydraulic pressure measured at a point in the apparatus doing the pressing. The method can include a curing step to produce the solid cleaning composition. As referred to herein, an uncured composition including the flowable solid is compressed to provide sufficient surface contact between particles making up the flowable solid that the uncured composition will solidify into a stable solid cleaning composition. A sufficient quantity of particles (e.g., granules) in contact with one another provides binding of particles to one another effective for making a stable solid composition. Inclusion of a curing step may include allowing the pressed solid to solidify for a period of time, such as a few hours, or about 1 day (or longer). In additional aspects, the methods could include vibrating the flowable solid in the form or mold, such as the methods disclosed in U.S. Pat. No. 8,889,048, which is herein incorporated by reference in its entirety.

The use of pressed solids provide numerous benefits over conventional solid block or tablet compositions requiring high pressure in a tablet press, or casting requiring the melting of a composition consuming significant amounts of energy, and/or by extrusion requiring expensive equipment and advanced technical know-how. Pressed solids overcome such various limitations of other solid formulations for which there is a need for making solid cleaning compositions. Moreover, pressed solid compositions retain its shape under conditions in which the composition may be stored or handled.

The following patents disclose various combinations of solidification, binding and/or hardening agents that can be utilized in the solid cleaning compositions of the present invention. The following U.S. patents are incorporated herein by reference: U.S. Pat. Nos. 7,153,820; 7,094,746; 7,087,569; 7,037,886; 6,831,054; 6,730,653; 6,660,707; 6,653,266; 6,583,094; 6,410,495; 6,258,765; 6,177,392; 6,156,715; 5,858,299; 5,316,688; 5,234,615; 5,198,198; 5,078,301; 4,595,520; 4,680,134; RE32,763; and RE32818.

Methods of Use

The surfactant systems and compositions employing the same can be used for a variety of domestic/consumer applications as well as industrial applications. The compositions can be applied in a variety of areas including kitchens, bathrooms, factories, hospitals, dental offices, pharmaceutical plants or co-packers, and food plants or co-packers, and can be applied to a variety of hard or soft surfaces having smooth, irregular or porous topography. Suitable hard surfaces include, for example, architectural surfaces (e.g., floors, walls, windows, sinks, tables, counters and signs); eating utensils; hard-surface medical or surgical instruments and devices; and hard-surface packaging. Such hard surfaces can be made from a variety of materials including, for example, ceramic, metal, glass, wood or hard plastic. Suitable soft surfaces include, for example paper, filter media, hospital and surgical linens and garments, soft-surface medical or surgical instruments and devices, and soft-surface packaging. Such soft surfaces can be made from a variety of materials including, for example, paper, fiber, woven or nonwoven fabric, soft plastics and elastomers.

The surfactant systems and compositions employing the same of the invention can be used in a variety of applications. For example, in some embodiments, the surfactant systems and compositions can be formulated for use in warewashing applications, including rinse cycles in commercial warewashing machines. A first type of rinse cycle can be referred to as a hot water sanitizing rinse cycle because of the use of generally hot rinse water (about 180° F.). A second type of rinse cycle can be referred to as a chemical sanitizing rinse cycle and it uses generally lower temperature rinse water (about 120° F.). Beneficially, the surfactant systems and compositions employing the same are particularly well suited for use in both low and high temperature conditions.

The methods of employing the surfactant systems and compositions employing the surfactant systems are particularly suited for use in closed systems, e.g. dish or ware washing systems for obtaining enhanced sheeting, wetting and drying on articles and surfaces. According to embodiments of the invention the surfactant systems and compositions employing the surfactant systems are suitable for both low temperature and high temperature applications.

In an aspect according to the invention, the surfactant systems and compositions employing the surfactant systems as disclosed herein are employed in low temperature warewash applications. As referred to herein, low temperature warewash includes was temperatures at or below about 140° F. In an embodiment, the temperature of the rinse water is up to about 140° F., preferably in the range of 100° F. to 140° F., preferably in the range of 110° F. to 140° F., and most preferably in the range of 120° F. to 140° F. As referred to herein, "low temperature" refers to those rinse water temperatures below about 140° F. In an aspect, the methods of the invention employing a low temperature further employ a sanitizer.

In a particularly preferred aspect, low temperature compositions may employ a combination of Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant D ($R^7$—O—$(PO)_{y5}(EO)_{x5}(PO)_{y6}$—H). In a further embodiment Surfactant E ($R^6$—O—$(PO)_{y4}(EO)_{x4}$—H) is excluded from the low temperature rinse aid surfactant system. In a further embodiment, for a solid composition Surfactant G ($(EO)_{x6}$ $(PO)_{y7}(EO)_{x6}$), an EO-PO-EO block copolymer, is included.

In an aspect according to the invention, the surfactant systems and compositions employing the surfactant systems as disclosed herein are employed in high temperature warewash applications. As referred to herein, high temperature (or sanitizing) rinse includes temperatures above about 140° F. In an aspect, high temperature refers to a rinse temperature for ware washing above 140° F., or from about 140° F. to about 190° F., or from about 145° F. to about 180° F.

In a particularly preferred aspect, high temperature compositions may employ a combination of Surfactant A ($R^1$—O-$(EO)_{x3}(PO)_{y3}$—H) (or Surfactant A2 ($R^1$—O-$(EO)_{x4}(PO)_{y4}$—H)), Surfactant B ($R^2$—O-$(EO)_{x1}$—H) and Surfactant C($R^2$—O-$(EO)_{x2}$—H). In a further embodiment Surfactant E ($R^6$—O—$(PO)_{y4}(EO)_{x4}$—H) is excluded from the high temperature rinse aid surfactant system. In a further embodiment, for a solid composition Surfactant G ($(EO)_{x6}(PO)_{y7}(EO)_{x6}$), an EO-PO-EO block copolymer, is included.

The surfactant systems and compositions employing the surfactant systems can contact the surface or article by numerous methods for applying a composition, such as spraying the composition, immersing the object in the composition, or a combination thereof. A concentrate or use concentration of a composition of the present invention can be applied to or brought into contact with an article by any conventional method or apparatus for applying a cleaning composition to an object. For example, the object can be wiped with, sprayed with, and/or immersed in the composition, or a use solution made from the composition. The composition can be sprayed, or wiped onto a surface; the composition can be caused to flow over the surface, or the surface can be dipped into the composition. Contacting can be manual or by machine.

In other embodiments, the surfactant systems and compositions employing the same can be used in a high solids containing water environment in order to reduce the appearance of a visible film caused by the level of dissolved solids provided in the water. In general, high solids containing water is considered to be water having a total dissolved solids (TDS) content in excess of 200 ppm. In certain localities, the service water contains a total dissolved solids content in excess of 400 ppm, and even in excess of 800 ppm. The applications where the presence of a visible film after washing a substrate is a particular problem includes the restaurant or warewashing industry, the car wash industry, and the general cleaning of hard surfaces.

Exemplary articles in the warewashing industry that can be treated with a surfactant systems and compositions employing the same include plastics, dishware, cups, glasses, flatware, and cookware. For the purposes of this invention, the terms “dish” and “ware” are used in the broadest sense to refer to various types of articles used in the preparation, serving, consumption, and disposal of food stuffs including pots, pans, trays, pitchers, bowls, plates, saucers, cups, glasses, forks, knives, spoons, spatulas, and other glass, metal, ceramic, plastic composite articles commonly available in the institutional or household kitchen or dining room. In general, these types of articles can be referred to as food or beverage contacting articles because they have surfaces which are provided for contacting food and/or beverage. When used in these warewashing applications, the surfactant systems provide effective sheeting action, low foaming properties and fast drying. In some aspects, the surfactant system and compositions employing the same dries a surface (e.g. ware) within about 30 seconds to a few minutes, or within about 30 to about 90 seconds after the aqueous solution is applied.

In addition to having the desirable properties described above, it may also be useful for the surfactant systems and compositions employing the same to be biodegradable, environmentally friendly, and generally nontoxic. A wetting agent of this type may be described as being “food grade”.

The surfactant systems and compositions employing the same may also be applied to surfaces and objects other than ware, including, but not limited to, medical and dental instruments, and hard surfaces such as vehicle surfaces or any other facility surfaces, textiles and laundry, use in mining and/or other industrial energy services. The compositions may also be used as rinse aids in a variety of applications for a variety of surfaces, e.g., included in compositions used to sanitize, disinfect, act as a sporicide for, or sterilize bottles, pumps, lines, tanks and mixing equipment used in the manufacture of such beverages. Still further, the surfactant systems and compositions employing the same are particularly suitable for use as rinse aids, including glass cleaners. These are other applications of use are included within the scope of the present invention.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Glewwe foam evaluation. Potential raw materials for rinse aids were initially tested in a Glewwe foam machine. The raw materials were tested in the Glewwe foam machine by themselves initially and then in different combination ratios with other raw materials based on activity of the specific raw material. The raw material(s) was added to the circulating water, and the foam generated was measured after one minute and five minutes. Products that produce excessive amounts of stable foam in this evaluation were identified as undesirable as they cause machine pump cavitation.

Table 4 shows initial testing of individual surfactants for foaming. The foam profiles indicate how much foam is generated by each individual surfactant at different temperatures to give a better understanding of how it will foam in a dish machine. The foam studies were completed using the Glewwe foam apparatus where foam level was read after one minute of agitation and again after 5 minutes of agitation. The Glewwe foam apparatus was set at 6 psi for 5 minutes at varied temperatures (° C.). The machine was then shut off and foam was measured for 1 minute. Test were run in soft water (3 L), used 20 g powdered milk and 50 ppm active surfactant (at 10000 actives level). The initial 1 minute testing shows foaming with surfactant only; the soil challenge after 5 minutes included presence of 2000 ppm soil and measured foaming with surfactant in presence of soil (indicative of foam measurement wherein a desirable foam profile is less than 5 inches.

TABLE 4

| Surfactant | Temp (° C.) | Rinse Aid grams used | After 1 min run time (inches); surfactant only Initial | 15 sec | 1 min | After 5 (total) min run time; soil challenge Initial | 15 sec | 1 min |
|---|---|---|---|---|---|---|---|---|
| F | 60 | 0.15 | 1¾ | 0 | 0 | 8 | 7¾ | 7¼ |
| G | 60 | 0.15 | 10 | 10 | 9 | — | — | — |
| H | 48 | 0.15 | 0 | 0 | 0 | 1 | 0 | 0 |
| H | 60 | 0.15 | 0 | 0 | 0 | 1¼ | 0 | 0 |
| H | 71 | 0.15 | 0 | 0 | 0 | 3 | 1 | 0 |
| D | 48 | 0.15 | 0 | 0 | 0 | Trace | 0 | 0 |
| D | 71 | 0.15 | 0 | 0 | 0 | 3 | 0 | 0 |
| A | 48 | 0.15 | 1 | ¼ | ⅛ | 5 | 3¾ | 2½ |
| A | 60 | 0.15 | 0 | 0 | 0 | 5 | 3½ | 1½ |
| A | 71 | 0.15 | 0 | 0 | 0 | 3½ | 1 | ¼ |
| J | 48 | 0.15 | ¾ | ¼ | ¼ | 3 | 1¼ | ¾ |
| J | 60 | 0.15 | 0 | 0 | 0 | 3 | ¾ | ½ |
| J | 71 | 0.15 | 0 | 0 | 0 | 3 | ¾ | ½ |
| I | 48 | 0.15 | 0 | 0 | 0 | 2 | Trace | 0 |
| I | 60 | 0.15 | Trace | 0 | 0 | 3 | ½ | >1/18 |
| I | 71 | 0.15 | Trace | 0 | 0 | 4 | 2½ | ½ |

The foam level in the machine was noted. In reference to the results shown in Table 4, the amount of foam in inches indicates how much foam remains, wherein a minimal amount is preferred after 1 minute and 15 minutes. Partially stable foam broke down slowly within a minute. Unstable foam broke rapidly, within less the 15 seconds. The best results were unstable foam or no foam, as generally, stable foam at any level is unacceptable. Foam that is less than one half of an inch and that is unstable and breaks to nothing soon after the machine is shut off is acceptable, but no foam is best. Various surfactants demonstrated beneficial low- or no-foam profiles under the testing conditions. The surfactants were then advanced for sheeting evaluation.

Example 2

Sheeting evaluation. The individual surfactants evaluated in Example 1 for foaming were also evaluated for sheeting in a dish machine to show individual capacity to sheet different types of dish ware. The test observes water sheeting on twelve different types of warewash materials, including: 10 oz. glass tumbler, a china dinner plate, a melamine dinner plate, a polypropylene coffee cup, a dinex bowl, a polypropylene jug, a polysulfonate dish, a stainless steel butter knife, a polypropylene café tray, a fiberglass café tray and a stainless steel slide 316.

For the evaluation the test materials are initially cleaned and then soiled with a solution containing a 0.2% hotpoint soil (mixture of powder milk and margarine). The materials were then exposed to 30 second wash cycles using 71° C. (160° F.) soft water (0 grain) (for high temperature evaluations) or 48° C. (120° F.) and 60° C. (140° F.) city water (for low temperature evaluations). The test product is measured in parts per million actives. Immediately after the warewash materials are exposed to the test product the appearance of the water draining off of the individual test materials (sheeting) is examined.

The results for evaluation of the individual surfactants are shown in Tables 5-8. Immediately after the ware wash materials were exposed to the rinse aid formulations, the appearance of the water draining off of the individual ware wash materials (sheeting) was examined and evaluated. The tables below show the results of these tests. In these tables, the sheeting evaluation is indicated by either a zero (0) signifying no sheeting, the number "one" (1) signifying pin hole sheeting, or the number "two" (2) signifying complete sheeting. Pinhole sheeting refers to the appearance of tiny pinholes on the surface of the water, as the water is draining off of the washed article. These holes increase slightly in size as the water continues to drain off the ware. Complete sheeting refers to a continuous sheet of water on the washed article as the water drains off the ware. The test was complete when all of the washed articles display complete sheeting.

TABLE 5

(Surfactant D, 0 grain; 69.4° C. (157° F.))

| | ppm, Actives in Rinse Aid 40 | 50 | 60 | 70 | 80 | 90 | 100 | 110 | 120 | 130 | 140 | 150 | 160 | 170 | 180 | 190 | 200 |
|---|---|---|---|---|---|---|---|---|---|---|---|---|---|---|---|---|---|
| Glass tumbler | 0 | 0 | 0 | 0 | 0 | 0 | 1 | 1 | 1 | 1 | 1 | 1 | 1 | 1 | 1 | 1 | 1 |
| China Plate | 0 | 0 | 0 | 1 | 1 | 1 | 1 | 1 | 1 | 1 | 1 | 1 | 1 | 1 | 1 | 1 | 1 |
| Melamine Plate | 0 | 1 | 1 | 1 | 1 | 1 | 1 | 1 | 1 | 1 | 1 | 1 | 1 | 1 | 1 | 1 | 1 |
| Polypropylene Cup (yellow) | 0 | 0 | 0 | 0 | 1 | 1 | 1 | 1 | 1 | 1 | 1 | 1 | 1 | 1 | 1 | 1 | 1 |
| Dinex Bowl (blue) | 0 | — | 1 | 1 | 1 | 1 | 1 | 1 | 1 | 1 | 1 | 1 | 1 | 2 | 2 | 2 | 2 |
| Polypropylene Jug (blue) | 0 | 1 | 1 | 1 | 1 | 1 | 1 | 1 | 1 | 1 | 1 | 2 | 2 | 2 | 2 | 2 | 2 |
| Polysulfonate Dish (clear tan) | 0 | 0 | 0 | 0 | 1 | 1 | 1 | 1 | 1 | 1 | 1 | 1 | 1 | 1 | 1 | 1 | 1 |
| Stainless Steel Knife | 0 | 1 | 1 | 1 | 1 | 1 | 1 | 1 | 1 | 1 | 1 | 1 | 1 | 1 | 1 | 1 | 1 |
| Polypropylene tray (peach) | 0 | 1 | 1 | 1 | 1 | 1 | 1 | 1 | 1 | 1 | 1 | 1 | 1 | 1 | 1 | 1 | 1 |
| Fiberglass tray (tan) | 0 | 0 | 0 | 0 | 0 | 0 | 1 | 1 | 1 | 1 | 2 | 2 | 2 | 2 | 2 | 2 | 2 |
| Stainless steel slide 316 | 0 | 1 | 1 | 1 | 1 | 1 | 1 | 1 | 1 | 1 | 1 | 1 | 1 | 1 | 1 | 1 | 1 |
| Suds | No | No | No | No | No | No | No | No | No | No | No | No | No | No | No | No | No |

TABLE 6

| Surfactant A; 0 grain; 69.4° C. (157° F.)) shows complete sheeting achieved at 110 ppm for all substrates. | | | | | | | | |
|---|---|---|---|---|---|---|---|---|
| | ppm, Actives in Rinse Aid | | | | | | | |
| | 40 | 50 | 60 | 70 | 80 | 90 | 100 | 110 |
| Glass tumbler | 0 | 0 | 0 | 1 | 1 | 2 | 2 | 2 |
| China Plate | 1 | 1 | 1 | 1 | 2 | 2 | 2 | 2 |
| Melamine Plate | 1 | 1 | 1 | 1 | 2 | 2 | 2 | 2 |
| Polypropylene Cup (yellow) | 0 | 0 | 0 | 0 | 0 | 1 | 1 | 2 |
| Dinex Bowl (blue) | 0 | 0 | 0 | 0 | 0 | 1 | 1 | 2 |
| Polypropylene Jug (blue) | 0 | 0 | 1 | 1 | 1 | 2 | 2 | 2 |
| Polysulfonate Dish (clear tan) | 0 | 0 | 1 | 1 | 1 | 2 | 2 | 2 |
| Stainless Steel Knife | 0 | 1 | 1 | 1 | 1 | 2 | 2 | 2 |
| Polypropylene tray (peach) | 1 | 1 | 1 | 1 | 1 | 2 | 2 | 2 |
| Fiberglass tray (tan) | 0 | 0 | 1 | 1 | 1 | 2 | 2 | 2 |
| Stainless steel slide 316 | 1 | 1 | 1 | 1 | 1 | 2 | 2 | 2 |
| Suds | No | No | No | No | No | No | No | No |

TABLE 7

| (Surfactant I; 0 grain; 69.4° C. (157° F.); T = trace) | | | | | | | | | | |
|---|---|---|---|---|---|---|---|---|---|---|
| ppm, Actives in Rinse Aid | 40 | 50 | 60 | 70 | 80 | 90 | 100 | 110 | 120 | 130 |
| Glass tumbler | 0 | 0 | 0 | 1 | 1 | 1 | 1 | 2 | 2 | 2 |
| China Plate | 0 | 1 | 1 | 1 | 1 | 2 | 2 | 2 | 2 | 2 |
| Melamine Plate | 0 | 1 | 1 | 1 | 1 | 1 | 2 | 2 | 2 | 2 |
| Polypropylene Cup (yellow) | 0 | 0 | 0 | 0 | 0 | 0 | 1 | 1 | 1 | 2 |
| Dinex Bowl (blue) | 0 | 0 | 0 | 1 | 1 | 2 | 2 | 2 | 2 | 2 |
| Polypropylene Jug (blue) | 0 | 0 | 0 | 1 | 1 | 1 | 1 | 1 | 1 | 2 |
| Polysulfonate Dish (clear tan) | 0 | 0 | 0 | 1 | 1 | 1 | 1 | 2 | 2 | 2 |
| Stainless Steel Knife | 0 | 1 | 1 | 1 | 1 | 1 | 1 | 1 | 1 | 2 |
| Polypropylene tray (peach) | 0 | 1 | 1 | 1 | 1 | 2 | 2 | 2 | 2 | 2 |
| Fiberglass tray (tan) | 0 | 0 | 0 | 1 | 1 | 1 | 1 | 1 | 1 | 1 |
| Stainless steel slide 316 | 0 | 1 | 1 | 1 | 1 | 1 | 1 | 1 | 2 | 2 |
| Suds | T | T | T | T | T | T | T | T | T | T |

TABLE 8

| (Surfactant J; 0 grain; 69.4° C. (157° F.)) | | | | | | | | | | | | | | | | | |
|---|---|---|---|---|---|---|---|---|---|---|---|---|---|---|---|---|---|
| ppm, Actives in Rinse Aid | 40 | 50 | 60 | 70 | 80 | 90 | 100 | 110 | 120 | 130 | 140 | 150 | 160 | 170 | 180 | 190 | 200 |
| Glass tumbler | 0 | 0 | 0 | 0 | 1 | 1 | 1 | 1 | 1 | 1 | 1 | 1 | 1 | 2 | 2 | 2 | 2 |
| China Plate | 0 | 0 | 0 | 1 | 1 | 1 | 1 | 1 | 1 | 1 | 1 | 1 | 1 | 1 | 1 | 1 | 1 |
| Melamine Plate | 0 | 0 | 1 | 1 | 1 | 1 | 1 | 1 | 1 | 1 | 1 | 1 | 1 | 1 | 1 | 1 | 1 |
| Polypropylene Cup (yellow) | 0 | 0 | 0 | 0 | 0 | 1 | 1 | 1 | 1 | 1 | 1 | 1 | 1 | 1 | 1 | 1 | 1 |
| Dinex Bowl (blue) | 0 | 0 | 0 | 0 | 1 | 1 | 1 | 1 | 1 | 1 | 1 | 1 | 1 | 1 | 1 | 1 | 1 |
| Polypropylene Jug (blue) | 0 | 0 | 0 | 1 | 1 | 1 | 1 | 1 | 1 | 1 | 1 | 1 | 1 | 1 | 1 | 1 | 1 |
| Polysulfonate Dish (clear tan) | 0 | 0 | 0 | 0 | 1 | 1 | 1 | 1 | 1 | 1 | 1 | 1 | 1 | 1 | 1 | 1 | 1 |
| Stainless Steel Knife | 0 | 0 | 0 | 1 | 1 | 1 | 1 | 1 | 1 | 1 | 1 | 1 | 1 | 1 | 2 | 2 | 2 |
| Polypropylene tray (peach) | 0 | 1 | 1 | 1 | 1 | 1 | 1 | 1 | 1 | 1 | 1 | 1 | 1 | 1 | 1 | 1 | 1 |
| Fiberglass tray (tan) | 0 | 0 | 0 | 0 | 0 | 0 | 0 | 1 | 1 | 1 | 1 | 1 | 1 | 1 | 1 | 1 | 1 |
| Stainless steel slide 316 | 0 | 0 | 1 | 1 | 1 | 1 | 1 | 1 | 1 | 1 | 1 | 1 | 1 | 1 | 1 | 1 | 1 |
| Suds | No | No | No | No | No | No | No | No | No | No | No | No | No | No | No | No | No |

Various surfactants demonstrated beneficial sheeting results under the testing conditions. Surfactant type A, from table 6 demonstrated full sheeting at relatively lower concentration than surfactant type D, I and J. The surfactants were then advanced dynamic contact angle evaluation with additional surfactants.

Example 3

Dynamic Contact Angle Measurement. The test quantitatively measured the angle at which a drop of solution contacts a test substrate. The rinse aid or surfactant(s) of desired concentration is created, and then placed into the apparatus. Rectangles of each plastic substrate material (melamine, polycarbonate, polypropylene) were cut from 6"×6" square slates. All experiments were carried out on a KRUSS DSA 100 drop shape analyzer. The solution and the coupon are then heated up in the chamber to the desired temperature. For each experiment, the rectangular substrate was placed onto the KRUSS DSA 100 stage with the temperature controlled by a Peltier plate. The temperature was set to 80° C.

The substrate was allowed to rest on the stage for 10 minutes to allow it to reach the desired temperature. A 5 ul droplet of the surfactant solution at 60 ppm surfactant concentration was deposited onto the substrate materials (polypropylene coupon, polycarbonate coupon and a melamine coupon), and the contact angle between the droplet and the surface was measured over a period of 12 seconds. Three measurements were carried out and averaged for each substrate/surfactant solution combination.

The deliverance of the drop to the substrate was recorded by a camera. The video captured by the camera is sent to a computer were the contact angle can be determined. The lower the contact angle the better the solution will induce sheeting. This means that the dishware will dry more quickly and with fewer spots once it has been removed from the dish machine.

Figure 2:
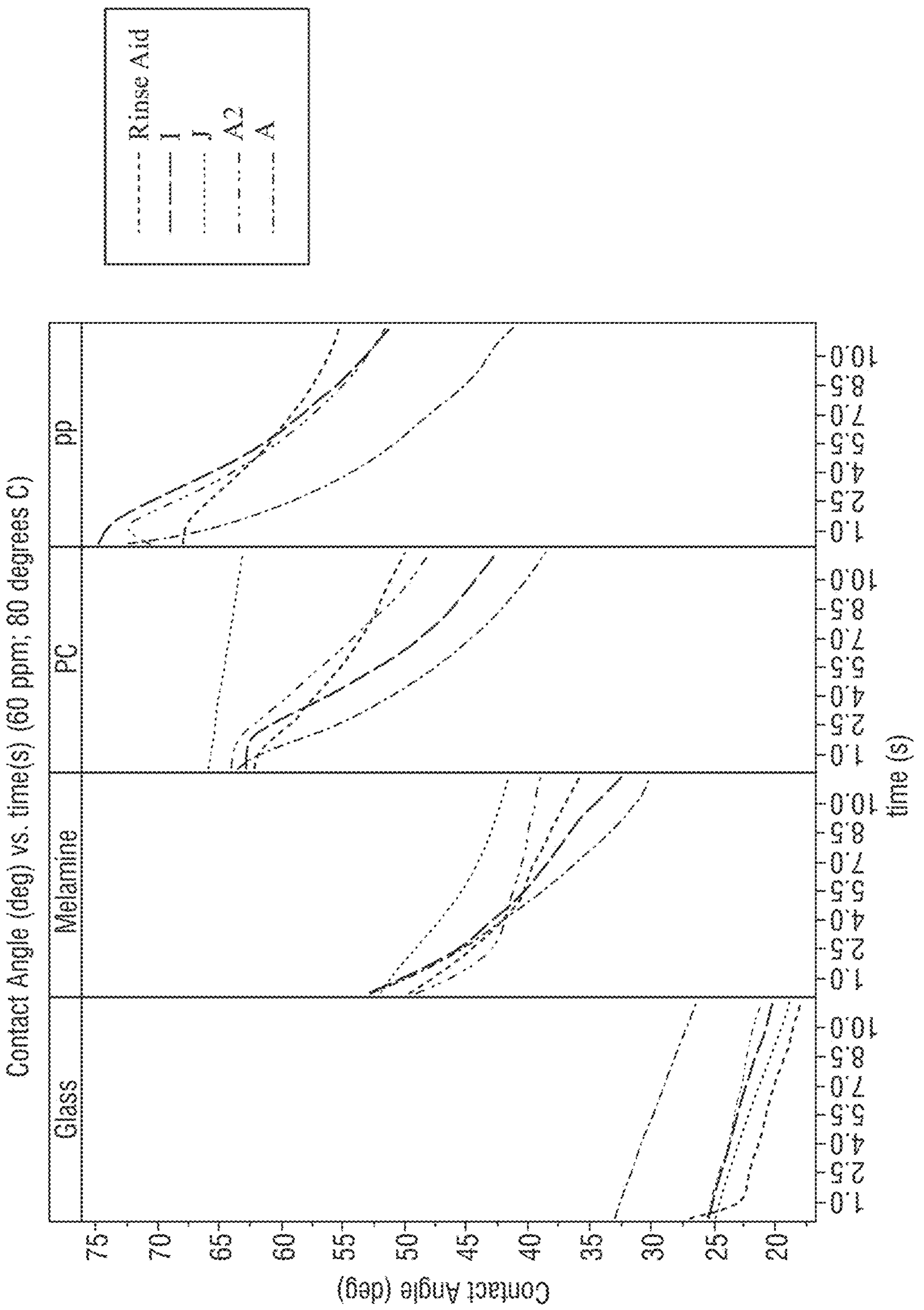
FIGS. 2-3 show the results of Example 3 where various individual surfactants were evaluated for dynamic contact angle showing wetting on various substrate surfaces.
Figure 3:
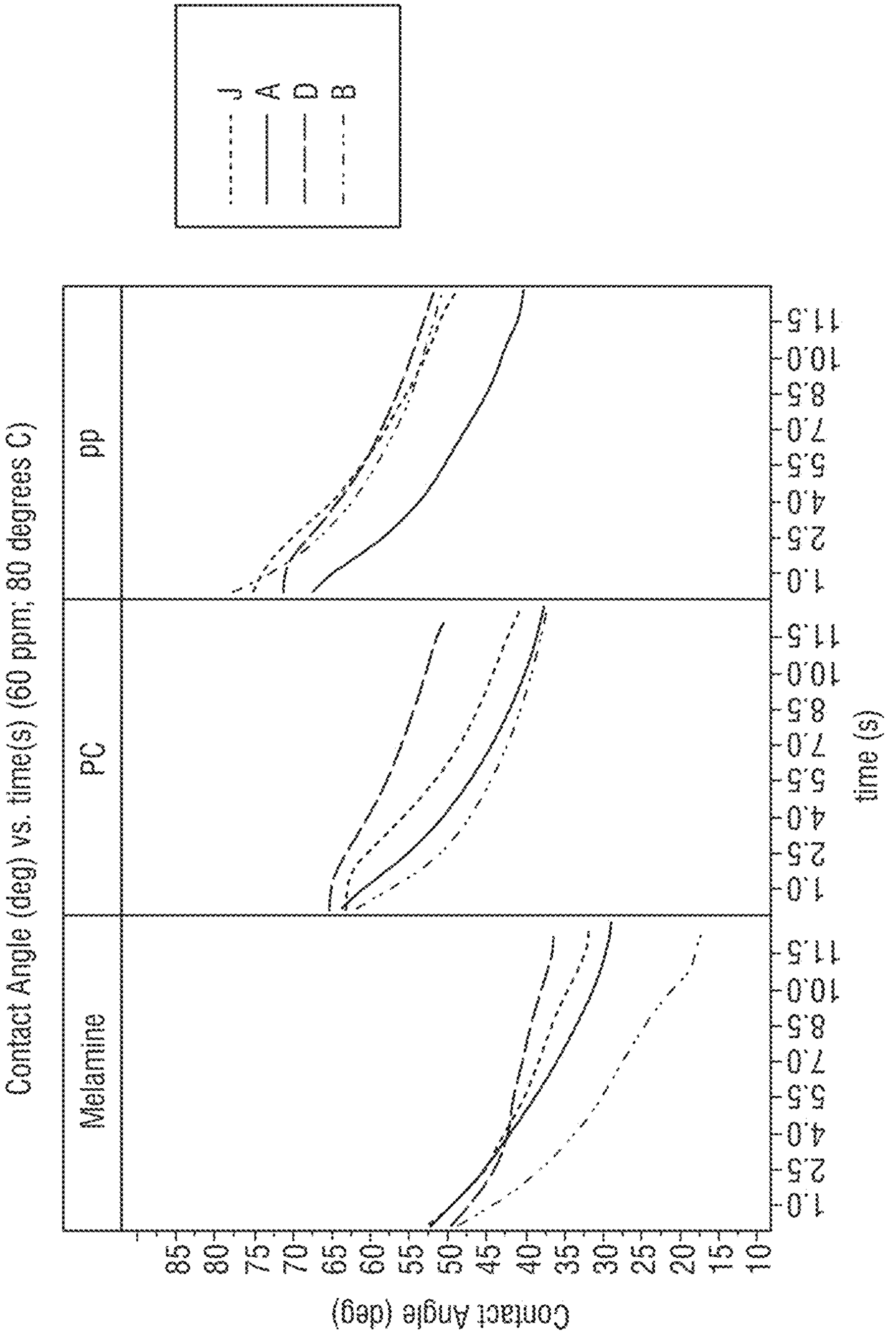

The results showing contact angle measurement are shown in FIGS. 2-3 were various surfactants were evaluated alone. FIGS. 2-3 demonstrate that as an individual surfactant A had the overall best performance for sheeting and wetting, with surfactant J, surfactant A2, and surfactant B providing good results as well. Surfactant D was selected as having acceptable results based on the demonstrated defoaming. Based on the evaluation of dynamic contact angle measurement, the highest performing surfactants were evaluated at differing ratios for foam (with and without a defoamer) as set forth in Example 4.

Example 4

The Glewwe foam evaluation set forth in Example 1 was conducted for the highest performing surfactants of Example 3 and compared differing ratios of the surfactants to evaluate for potential synergy of the combinations of foaming benefits. Table 9 shows the combinations of surfactants screened for synergy.

Single surfactants or combinations with greater than 8" of foam after the five minute initial reading are considered as excessive foam for the application. Single surfactants or combinations with less than 8" of foam but greater than 5" of foam after the five minute initial reading are considered as candidates for the application, but will need additional defoaming from a separate source of a defoaming surfactant such as surfactant type D. Single surfactants or combinations with less than 5" of foam after the five minute initial reading are considered more ideal candidates for the application if the resulting foam continues to break to less than 1" after the final foam reading. Combinations of surfactant A and B, for example, would require addition of surfactant type D for favorable foam profiles.

TABLE 9

| | | | | | Temp | Rinse Aid | Actives | After 1 min run time (inches) | | | After 5 (total) minutes run time | | |
|---|---|---|---|---|---|---|---|---|---|---|---|---|---|
| Run | A | I | B | D | (° F.) | grams used | level | Initial | 15 sec | 1 min | Initial | 15 sec | 1 min |
| 1 | 0 | 0 | 1 | 0 | 140 | 0.15 | 100% | 5 | 4 1/2 | 2 | 8 3/4 | 8 1/2 | 8 |
| 2 | 0.45 | 0 | 0.4 | 0.15 | 140 | 0.15 | 100% | 1 | 1/8 | Trace | 5 1/4 | 3 | 1 1/2 |
| 3 | 0 | 1 | 0 | 0 | 140 | 0.15 | 100% | 0 | 0 | 0 | 3 | 3/4 | 1/2 |
| 4 | 0 | 0.75 | 0 | 0.25 | 140 | 0.15 | 100% | 0 | 0 | 0 | 4 1/2 | 3 1/4 | 1 1/2 |
| 5 | 1 | 0 | 0 | 0 | 140 | 0.15 | 100% | 0 | 0 | 0 | 5 | 3 1/2 | 1 1/2 |
| 6 | 0.75 | 0 | 0 | 0.25 | 140 | 0.15 | 100% | 0 | 0 | 0 | 2 1/2 | 1/2 | 1/4 |
| 7 | 0 | 0 | 0.85 | 0.15 | 140 | 0.15 | 100% | 2 3/4 | 1 1/4 | 1/8 | 7 1/2 | 5 | 4 1/2 |
| 8 | 0.333 | 0.333 | 0.333 | 0 | 140 | 0.15 | 100% | 1/4 | 1/16 | 1/16 | 6 1/4 | 5 1/2 | 2 1/2 |
| 9 | 1 | 0 | 0 | 0 | 140 | 0.15 | 100% | 0 | 0 | 0 | 5 1/8 | 3 5/8 | 2 5/8 |
| 10 | 0.375 | 0.375 | 0 | 0.25 | 140 | 0.15 | 100% | 0 | 0 | 0 | 2 1/2 | 3/4 | 3/8 |
| 11 | 0.5 | 0 | 0.5 | 0 | 140 | 0.15 | 100% | 2 | 1/2 | 1/8 | 9 | 9 | 9 |
| 12 | 0 | 0 | 0.75 | 0.25 | 140 | 0.15 | 100% | 2 | 1/2 | 1/8 | 6 | 4 1/2 | 2 1/4 |
| 13 | 0 | 0.5 | 0.5 | 0 | 140 | 0.15 | 100% | 1 1/4 | 3/8 | 1/8 | 7 3/4 | 6 3/4 | 5 3/8 |
| 14 | 0 | 0.85 | 0 | 0.15 | 140 | 0.15 | 100% | 0 | 0 | 0 | 2 1/4 | 1/2 | 3/8 |
| 15 | 0.5 | 0.5 | 0 | 0 | 140 | 0.15 | 100% | 0 | 0 | 0 | 3 1/4 | 1 | 3/4 |
| 16 | 0 | 0.425 | 0.425 | 0.15 | 140 | 0.15 | 100% | 1 1/4 | 3/8 | 1/4 | 5 | 2 1/2 | 3/4 |
| 17 | 0 | 0.375 | 0.375 | 0.25 | 140 | 0.15 | 100% | 3/4 | 1/8 | 1/8 | 4 3/4 | 1 1/4 | 5/8 |
| 18 | 0.361 | 0 | 0.388 | 0.25 | 140 | 0.15 | 100% | 1 | 1/4 | 1/8 | 5 1/4 | 2 3/4 | 5/8 |
| 19 | 0.437 | 0.412 | 0 | 0.15 | 140 | 0.15 | 100% | 0 | 0 | 0 | 3 | 3/4 | 1/2 |
| 20 | 0.75 | 0 | 0 | 0.25 | 140 | 0.15 | 100% | 0 | 0 | 0 | 3 | 3/8 | 1/4 |

Table 10 shows combinations of surfactants initially screened for synergy. Single surfactants or combinations with less than 5" of foam after the five minute initial reading are considered more ideal candidates for the application if the resulting foam continues to break to less than 1" after the final foam reading. Addition of surfactant type D to combinations of surfactant A and I, for example, show favorable foam profiles for the application.

TABLE 10

| | Temp | Rinse Aid | Actives | After 1 min run time (inches) | | | After 5 (total) minutes run time | | |
|---|---|---|---|---|---|---|---|---|---|
| Product | (° F.) | grams used | level | Initial | 15 sec | 1 min | Initial | 15 sec | 1 min |
| A/I 80:20 Ratio | 120 | 0.15 | 100% | 1/2 | 1/4 | 1/4 | 2 1/2 | 3/4 | 1/2 |
| A/I 80:20 Ratio | 140 | 0.15 | 100% | 0 | 0 | 0 | 3 | 3/4 | 1/2 |
| A/I 80:20 Ratio | 160 | 0.15 | 100% | 0 | 0 | 0 | 3 | 3/4 | 1/2 |
| #21 60% A/15% I/25% D | 140 | 0.15 | 100% | 0 | 0 | 0 | 2 3/4 | 3/8 | 3/8 |
| #22 60% A/15% I/25% H | 140 | 0.15 | 100% | 0 | 0 | 0 | 2 3/4 | 1/2 | 3/8 |
| #23 60% A/15% I/20% D/5% H | 140 | 0.15 | 100% | 0 | 0 | 0 | 4 1/2 | 1 | 1/2 |
| #24 60% A/15% I/20% D/5% B | 140 | 0.15 | 100% | 0 | 0 | 0 | 3 3/4 | 1 | 3/8 |
| #25 56% A/14% I/25% D/5% B | 140 | 0.15 | 100% | 0 | 0 | 0 | 3 | 3/8 | 3/8 |
| #26 60% A/15% I/20% H/5% D | 140 | 0.15 | 100% | 0 | 0 | 0 | 3 1/2 | 1 | 3/8 |
| #27 56% A/14% I/25% H/5% B | 140 | 0.15 | 100% | Trace | Trace | Trace | 4 | 1 1/2 | 5/8 |

Table 11 shows further combinations of surfactants screened for synergy with beneficial results demonstrated with use of surfactant C in place of surfactant B for a relatively lower foam combination. While surfactant C, by itself do not exhibit acceptable foam characteristics, blend of surfactant A, I and C show favorable foam profile as opposed to surfactant combinations of A, I and B. Single surfactants or combinations with greater than 8" of foam after the five minute initial reading are considered as excessive foam for the application. Single surfactants or combinations with less than 8" of foam but greater than 5" of foam after the five minute initial reading are considered as candidates for the application, but will need additional defoaming from a separate source of a defoaming surfactant such as surfactant type D, or alternatively the use of less surfactant type B in combination with additional surfactant type C. Single surfactants or combinations with less than 5" of foam after the five minute initial reading are considered more ideal candidates for the application if the resulting foam continues to break to less than 1" after the final foam reading. The combination of A, I and C meet favorable foam profiles while the combination of A, I and B would require additional defoaming.

TABLE 11

| | | | | | Temp | Rinse Aid | Actives | After 1 min run time (inches) | | | After 5 (total) minutes run time | | |
|---|---|---|---|---|---|---|---|---|---|---|---|---|---|
| Run | A | I | J | C | (° F.) | grams used | level | Initial | 15 sec | 1 min | Initial | 15 sec | 1 min |
| 1 | 0.33333 | 0.33333 | 0 | 0.33333 | 140 | 0.15 | 100% | 0 | 0 | 0 | 4 | ¾ | ½ |
| 2 | 0 | 1 | 0 | 0 | 140 | 0.15 | 100% | 0 | 0 | 0 | 3 | ¾ | ½ |
| 3 | 0.82 | 0 | 0.18 | 0 | 140 | 0.15 | 100% | 0 | 0 | 0 | 3¾ | 1½ | ½ |
| 4 | 0 | 0 | 0 | 1 | 140 | 0.15 | 100% | Trace | 0 | 0 | 8 | 7 | 3¼ |
| 5 | 0.395 | 0.425 | 0.18 | 0.82 | 140 | 0.15 | 100% | Trace | 0 | 0 | 4 | 1½ | ½ |
| 6 | 0 | 0 | 0.18 | 0.82 | 140 | 0.15 | 100% | Trace | 0 | 0 | 5¼ | 1½ | 1 |
| 7 | 0.36946 | 0.33054 | 0.3 | 0 | 140 | 0.15 | 100% | 0 | 0 | 0 | 3½ | 1 | ½ |
| 8 | 0.5 | 0.5 | 0 | 0 | 140 | 0.15 | 100% | 0 | 0 | 0 | 3¾ | 1 | ¾ |
| 9 | 0 | 0 | 0.3 | 0.7 | 140 | 0.15 | 100% | Trace | 0 | 0 | 4¼ | 1 | ⅝ |
| 10 | 0.33333 | 0.33333 | 0 | 0.33333 | 140 | 0.15 | 100% | 0 | 0 | 0 | 4 | ¾ | ½ |
| 11 | 0 | 0.44 | 0.18 | 0.38 | 140 | 0.15 | 100% | Trace | 0 | 0 | 3¾ | ½ | ½ |
| 12 | 0.7 | 0 | 0.3 | 0 | 140 | 0.15 | 100% | 0 | 0 | 0 | 4 | ¾ | ½ |
| 13 | 0 | 0.7 | 0.3 | 0 | 140 | 0.15 | 100% | 0 | 0 | 0 | 2½ | ⅜ | ¼ |
| 14 | 0.5 | 0 | 0 | 0.5 | 140 | 0.15 | 100% | Trace | 0 | 0 | 4¾ | 1½ | 1 |
| 15 | 0.41 | 0 | 0.18 | 0.41 | 140 | 0.15 | 100% | 0 | 0 | 0 | 4 | ¾ | ½ |
| 16 | 0 | 0.7 | 0.3 | 0 | 140 | 0.15 | 100% | 0 | 0 | 0 | 2½ | ⅜ | ¼ |
| 17 | 0 | 0.35 | 0.3 | 0.35 | 140 | 0.15 | 100% | 0 | 0 | 0 | 3¼ | ⅜ | ⅜ |
| 18 | 0.35 | 0 | 0.3 | 0.35 | 140 | 0.15 | 100% | 0 | 0 | 0 | 3½ | ½ | ½ |
| 19 | 0 | 0.5 | 0 | 0.5 | 140 | 0.15 | 100% | Trace | 0 | 0 | 4¼ | 1¼ | ¾ |
| 20 | 1 | 0 | 0 | 0 | 140 | 0.15 | 100% | 0 | 0 | 0 | 5 | 3½ | 1½ |
| 21 | 0.074 | 0.778 | 0 | 0.148 | 140 | 0.15 | 100% | 0 | 0 | 0 | 2¾ | ⅜ | ¼ |
| 22 | 0.187 | 0.606 | 0 | 0.207 | 140 | 0.15 | 100% | Trace | 0 | 0 | 5 | 2 | ½ |
| 23 | 0.364 | 0.414 | 0 | 0.222 | 140 | 0.15 | 100% | Trace | 0 | 0 | 4 | 1 | ½ |
| 24 | 0 | 0.900 | 0 | 0.100 | 140 | 0.15 | 100% | 0 | 0 | 0 | 3½ | ½ | ⅜ |

Example 5

The sheeting evaluation set forth in Example 2 was conducted using the highest performing surfactants combinations of Example 4 comparing differing ratios of the surfactants to evaluate for potential synergy of the combinations of sheeting benefits with and without defoamer.

TABLE 12

(40% A/40% B/20% C; 0 grain; 65.5° C. (150° F.))

| ppm, Actives in Rinse Aid | 10 | 20 | 30 | 40 | 50 |
|---|---|---|---|---|---|
| Glass tumbler | 0 | 1 | 2 | 2 | 2 |
| China Plate | 0 | 0 | 1 | 1 | 2 |
| Melamine Plate | 0 | 1 | 1 | 2 | 2 |
| Polypropylene Cup (yellow) | 0 | 0 | 1 | 1 | 2 |
| Dinex Bowl (blue) | 0 | 0 | 1 | 1 | 2 |
| Polypropylene Jug (blue) | 0 | 0 | 1 | 1 | 2 |
| Polysulfonate Dish (clear tan) | 0 | 0 | 1 | 1 | 2 |
| Stainless Steel Knife | 0 | 0 | 1 | 1 | 2 |
| Polypropylene tray (peach) | 0 | 0 | 1 | 1 | 2 |
| Fiberglass tray (tan) | 0 | 0 | 0 | 1 | 2 |
| Stainless steel slide 316 | 0 | 1 | 1 | 2 | 2 |
| Suds | 0.25" stable foam | | | | |

The results depicted in Table 12 show an excellent result of the surfactant system providing efficacy at low concentrations (50 ppm or less).

TABLE 13

(36.5% A/22.1% C/41.4% I; 0 grain; 64.4° C. (148° F.).

| ppm, Actives in Rinse Aid | 10 | 20 | 30 | 40 | 50 | 60 | 70 | 80 | 90 | 100 |
|---|---|---|---|---|---|---|---|---|---|---|
| Glass tumbler | 0 | 0 | 0 | 0 | 0 | 1 | 1 | 1 | 2 | 2 |
| China Plate | 0 | 0 | 0 | 0 | 1 | 1 | 1 | 2 | 2 | 2 |
| Melamine Plate | 0 | 1 | 1 | 2 | 2 | 2 | 2 | 2 | 2 | 2 |
| Polypropylene Cup (yellow) | 0 | 0 | 1 | 1 | 2 | 2 | 2 | 2 | 2 | 2 |
| Dinex Bowl (blue) | 0 | 1 | 1 | 1 | 2 | 2 | 2 | 2 | 2 | 2 |
| Polypropylene Jug (blue) | 0 | 1 | 1 | 1 | 1 | 2 | 2 | 2 | 2 | 2 |
| Polysulfonate Dish (clear tan) | 0 | 0 | 1 | 1 | 2 | 2 | 2 | 2 | 2 | 2 |
| Stainless Steel Knife | 0 | 0 | 1 | 1 | 1 | 2 | 2 | 2 | 2 | 2 |
| Polypropylene tray (peach) | 0 | 0 | 1 | 1 | 1 | 1 | 1 | 1 | 1 | 2 |
| Fiberglass tray (tan) | 0 | 0 | 0 | 0 | 1 | 1 | 1 | 2 | 2 | 2 |
| Stainless steel slide 316 | 0 | 1 | 1 | 1 | 1 | 1 | 1 | 1 | 2 | 2 |
| Suds | 0.125" foam that breaks to trace within 15 seconds | | | | | | | | | |

The results depicted in Table 13 show improved results as compared to commercial rinse additives with the surfactant system providing efficacy at concentrations at 100 ppm or less, with less foam than combinations of A, B, C as observed during the test. However the combination of A, C, I does not provide the efficiency of complete sheeting as compared to the combination of A, B, C.

TABLE 14

(40% A/20% C/40% A2; 0 grain; 66° C. (150° F.)).

| ppm, Actives in Rinse Aid | 10 | 20 | 30 | 40 | 50 | 60 | 70 | 80 | 90 | 100 |
|---|---|---|---|---|---|---|---|---|---|---|
| Glass tumbler | 0 | 0 | 0 | 1 | 1 | 1 | 1 | 2 | 2 | 2 |
| China Plate | 0 | 0 | 1 | 1 | 1 | 1 | 1 | 1 | 1 | 2 |
| Melamine Plate | 1 | 1 | 1 | 1 | 1 | 2 | 2 | 2 | 2 | 2 |
| Polypropylene Cup (yellow) | 0 | 0 | 0 | 1 | 1 | 1 | 1 | 1 | 2 | 2 |
| Dinex Bowl (blue) | 0 | 0 | 1 | 1 | 1 | 1 | 1 | 1 | 2 | 2 |
| Polypropylene Jug (blue) | 0 | 0 | 1 | 1 | 1 | 1 | 1 | 1 | 2 | 2 |
| Polysulfonate Dish (clear tan) | 0 | 0 | 0 | 1 | 1 | 1 | 1 | 1 | 2 | 2 |
| Stainless Steel Knife | 0 | 0 | 0 | 1 | 1 | 1 | 1 | 1 | 2 | 2 |
| Polypropylene tray (peach) | 0 | 0 | 1 | 1 | 1 | 1 | 1 | 2 | 2 | 2 |
| Fiberglass tray (tan) | 0 | 0 | 0 | 0 | 1 | 1 | 1 | 1 | 1 | 2 |
| Stainless steel slide 316 | 0 | 0 | 1 | 1 | 1 | 1 | 1 | 2 | 2 | 2 |
| Suds | Trace of stable foam | | | | | | | | | |

The results depicted in Table 14 show improved results as compared to commercial rinse additives with the surfactant system providing efficacy at concentrations at 100 ppm or less. The use of A with A2 and C does not provide the efficiency of complete sheeting as shown in examples of surfactant combinations of A, B and C.

TABLE 15

(40% A/20% B/40% A2; 0 grain; 66° C. (150° F.)).

| ppm, Actives in Rinse Aid | 10 | 20 | 30 | 40 | 50 | 60 | 70 |
|---|---|---|---|---|---|---|---|
| Glass tumbler | 0 | 0 | 0 | 1 | 2 | 2 | 2 |
| China Plate | 0 | 0 | 1 | 1 | 1 | 1 | 2 |
| Melamine Plate | 1 | 1 | 1 | 2 | 2 | 2 | 2 |
| Polypropylene Cup (yellow) | 0 | 0 | 1 | 1 | 2 | 2 | 2 |
| Dinex Bowl (blue) | 0 | 0 | 1 | 2 | 2 | 2 | 2 |
| Polypropylene Jug (blue) | 0 | 0 | 1 | 1 | 2 | 2 | 2 |

TABLE 15-continued (40% A/20% B/40% A2; 0 grain; 66° C. (150° F.)).

| ppm, Actives in Rinse Aid | 10 | 20 | 30 | 40 | 50 | 60 | 70 |
|---|---|---|---|---|---|---|---|
| Polysulfonate Dish (clear tan) | 0 | 0 | 1 | 2 | 2 | 2 | 2 |
| Stainless Steel Knife | 0 | 0 | 0 | 1 | 2 | 2 | 2 |
| Polypropylene tray (peach) | 0 | 0 | 1 | 2 | 2 | 2 | 2 |
| Fiberglass tray (tan) | 0 | 0 | 0 | 1 | 1 | 2 | 2 |
| Stainless steel slide 316 | 0 | 1 | 1 | 1 | 2 | 2 | 2 |
| Suds | Trace of stable foam | | | | | | |

The results depicted in Table 15 show improved results as compared to commercial rinse additives with the surfactant system providing efficacy at concentrations at 70 ppm or less. The use of A with A2 and B does not provide the efficiency of complete sheeting as shown in examples of surfactant combinations of A, B and C.

TABLE 16

(56% A/5% B/14% I/25% D; 0 grain; 63.3° C. (146° F.)).

| ppm, Actives in Rinse Aid | 10 | 20 | 30 | 40 | 50 | 60 | 70 | 80 | 90 | 100 |
|---|---|---|---|---|---|---|---|---|---|---|
| Glass tumbler | 0 | 0 | 0 | 0 | 0 | 1 | 1 | 1 | 2 | 2 |
| China Plate | 0 | 0 | 1 | 1 | 1 | 1 | 1 | 1 | 1 | 2 |
| Melamine Plate | 1 | 1 | 1 | 1 | 1 | 1 | 2 | 2 | 2 | 2 |
| Polypropylene Cup (yellow) | 0 | 0 | 0 | 0 | 1 | 2 | 2 | 2 | 2 | 2 |
| Dinex Bowl (blue) | 0 | 0 | 1 | 1 | 1 | 2 | 2 | 2 | 2 | 2 |
| Polypropylene Jug (blue) | 0 | 0 | 1 | 1 | 1 | 2 | 2 | 2 | 2 | 2 |
| Polysulfonate Dish (clear tan) | 0 | 0 | 0 | 1 | 1 | 1 | 1 | 2 | 2 | 2 |
| Stainless Steel Knife | 0 | 0 | 0 | 0 | 1 | 1 | 1 | 1 | 2 | 2 |
| Polypropylene tray (peach) | 0 | 0 | 0 | 1 | 1 | 1 | 1 | 2 | 2 | 2 |
| Fiberglass tray (tan) | 0 | 0 | 0 | 0 | 1 | 1 | 1 | 1 | 1 | 2 |
| Stainless steel slide 316 | 0 | 1 | 1 | 1 | 1 | 1 | 1 | 1 | 2 | 2 |
| Suds | Trace | | | | | | | | | |

The results depicted in Table 16 show improved results as compared to commercial rinse additives with the surfactant system providing efficacy at concentrations at 100 ppm or less. However the addition of surfactant types I and D which exhibit favorable foam profiles individually, decrease the efficiency of complete sheeting.

TABLE 17

(40% J/40% A2/20% H; 0 grain; 64.4° C. (148° F.)).

| ppm, Actives in Rinse Aid | 10 | 20 | 30 | 40 | 50 | 60 | 70 | 80 | 90 | 100 |
|---|---|---|---|---|---|---|---|---|---|---|
| Glass tumbler | 0 | 0 | 0 | 0 | 1 | 1 | 1 | 1 | 1 | 2 |
| China Plate | 0 | 0 | 0 | 0 | 0 | 0 | 1 | 1 | 2 | 2 |
| Melamine Plate | 1 | 1 | 1 | 1 | 2 | 2 | 2 | 2 | 2 | 2 |
| Polypropylene Cup (yellow) | 0 | 0 | 0 | 1 | 1 | 1 | 2 | 2 | 2 | 2 |
| Dinex Bowl (blue) | 0 | 0 | 0 | 1 | 2 | 2 | 2 | 2 | 2 | 2 |
| Polypropylene Jug (blue) | 0 | 0 | 1 | 1 | 1 | 1 | 2 | 2 | 2 | 2 |
| Polysulfonate Dish (clear tan) | 0 | 0 | 0 | 1 | 2 | 2 | 2 | 2 | 2 | 2 |
| Stainless Steel Knife | 0 | 0 | 0 | 1 | 1 | 1 | 1 | 2 | 2 | 2 |
| Polypropylene tray (peach) | 0 | 0 | 1 | 1 | 1 | 1 | 2 | 2 | 2 | 2 |
| Fiberglass tray (tan) | 0 | 0 | 1 | 1 | 1 | 1 | 1 | 2 | 2 | 2 |
| Stainless steel slide 316 | 0 | 0 | 1 | 1 | 1 | 1 | 1 | 2 | 2 | 2 |
| Suds | Trace gone within seconds | | | | | | | | | |

The results depicted in Table 17 show improved results as compared to commercial rinse additives with the surfactant system providing efficacy at concentrations at 100 ppm or less. However the addition of surfactant types J and H which exhibit favorable foam profiles individually, decrease the efficiency of complete sheeting.

TABLE 18

| (40% A/40% A2/20% H; 0 grain; 66° C. (150° F.)). | | | | | | | | | |
|---|---|---|---|---|---|---|---|---|---|
| ppm, Actives in Rinse Aid | 10 | 20 | 30 | 40 | 50 | 60 | 70 | 80 | 90 |
| Glass tumbler | 0 | 0 | 0 | 0 | 1 | 1 | 1 | 2 | 1 |
| China Plate | 0 | 0 | 0 | 0 | 1 | 1 | 1 | 1 | 2 |
| Melamine Plate | 1 | 1 | 1 | 1 | 1 | 1 | 2 | 2 | 2 |
| Polypropylene Cup (yellow) | 0 | 0 | 0 | 1 | 1 | 1 | 1 | 2 | 2 |
| Dinex Bowl (blue) | 0 | 0 | 1 | 1 | 1 | 1 | 2 | 2 | 2 |
| Polypropylene Jug (blue) | 0 | 0 | 1 | 1 | 1 | 2 | 2 | 2 | 2 |
| Polysulfonate Dish (clear tan) | 0 | 0 | 1 | 1 | 1 | 2 | 2 | 2 | 2 |
| Stainless Steel Knife | 0 | 0 | 1 | 1 | 1 | 2 | 2 | 2 | 2 |
| Polypropylene tray (peach) | 0 | 1 | 1 | 1 | 1 | 1 | 1 | 1 | 2 |
| Fiberglass tray (tan) | 0 | 1 | 1 | 1 | 1 | 1 | 1 | 2 | 2 |
| Stainless steel slide 316 | 0 | 1 | 1 | 1 | 1 | 1 | 2 | 2 | 2 |
| Suds | No foam | | | | | | | | |

The results depicted in Table 18 show improved results as compared to commercial rinse additives with the surfactant system providing efficacy at concentrations at 100 ppm or less. However the addition of surfactant types G which exhibit favorable foam profiles individually, decrease the efficiency of complete sheeting as compared to blends of A, B, C.

TABLE 19

| (50% B/50% D; 0 grain; 66° C. (150° F.)). | | | | | | | |
|---|---|---|---|---|---|---|---|
| ppm, Actives in Rinse Aid | 10 | 20 | 30 | 40 | 50 | 60 | 70 |
| Glass tumbler | 0 | 0 | 0 | 1 | 2 | 2 | 2 |
| China Plate | 0 | 0 | 0 | 1 | 1 | 1 | 2 |
| Melamine Plate | 1 | 1 | 1 | 1 | 2 | 2 | 2 |
| Polypropylene Cup (yellow) | 0 | 0 | 1 | 1 | 2 | 2 | 2 |
| Dinex Bowl (blue) | 0 | 0 | 1 | 1 | 2 | 2 | 2 |
| Polypropylene Jug (blue) | 0 | 0 | 0 | 1 | 2 | 2 | 2 |
| Polysulfonate Dish (clear tan) | 0 | 0 | 1 | 1 | 2 | 2 | 2 |
| Stainless Steel Knife | 0 | 0 | 1 | 1 | 1 | 2 | 2 |
| Polypropylene tray (peach) | 0 | 1 | 1 | 1 | 2 | 2 | 2 |
| Fiberglass tray (tan) | 0 | 1 | 1 | 1 | 2 | 2 | 2 |
| Stainless steel slide 316 | 0 | 0 | 1 | 1 | 1 | 2 | 2 |
| Suds | 0.25" stable foam | | | | | | |

The results depicted in Table 19 show improved results as compared to commercial rinse additives with the surfactant system providing efficacy at concentrations at 70 ppm or less. However, while the addition of surfactant combination of B with D provides unexpected efficiency, the combination of B with D is not as efficient as the combination of A, B, C.

The results shown in Tables 12-19 show significantly improved and synergistic results for surfactant system A/B/C (40/40/20 ratio), the surfactant system A/B/A2 (40/20/40 ratio) and the surfactant system B/D (50/50 ratio). Unexpectedly, the synergistic combinations result in a potential antagonist effect with increased amount of defoamer in the surfactant systems. Without being limited to a particular mechanism of action, the antagonist effect indicated by slightly worse efficacy with defoamer may be a result of interfere with wetting and sheeting in the surfactant systems according to the invention. As a result, the surfactant systems and compositions employing the same preferably do not require a defoaming agent and/or employ a lesser concentration of a defoaming agent, including for example less than about 20 wt-% of a defoaming agent (such as surfactant D). In other embodiments, a detergent composition employing a defoaming agent may follow the use of a surfactant system and compositions employing the same in an application of use.

Figure 4:
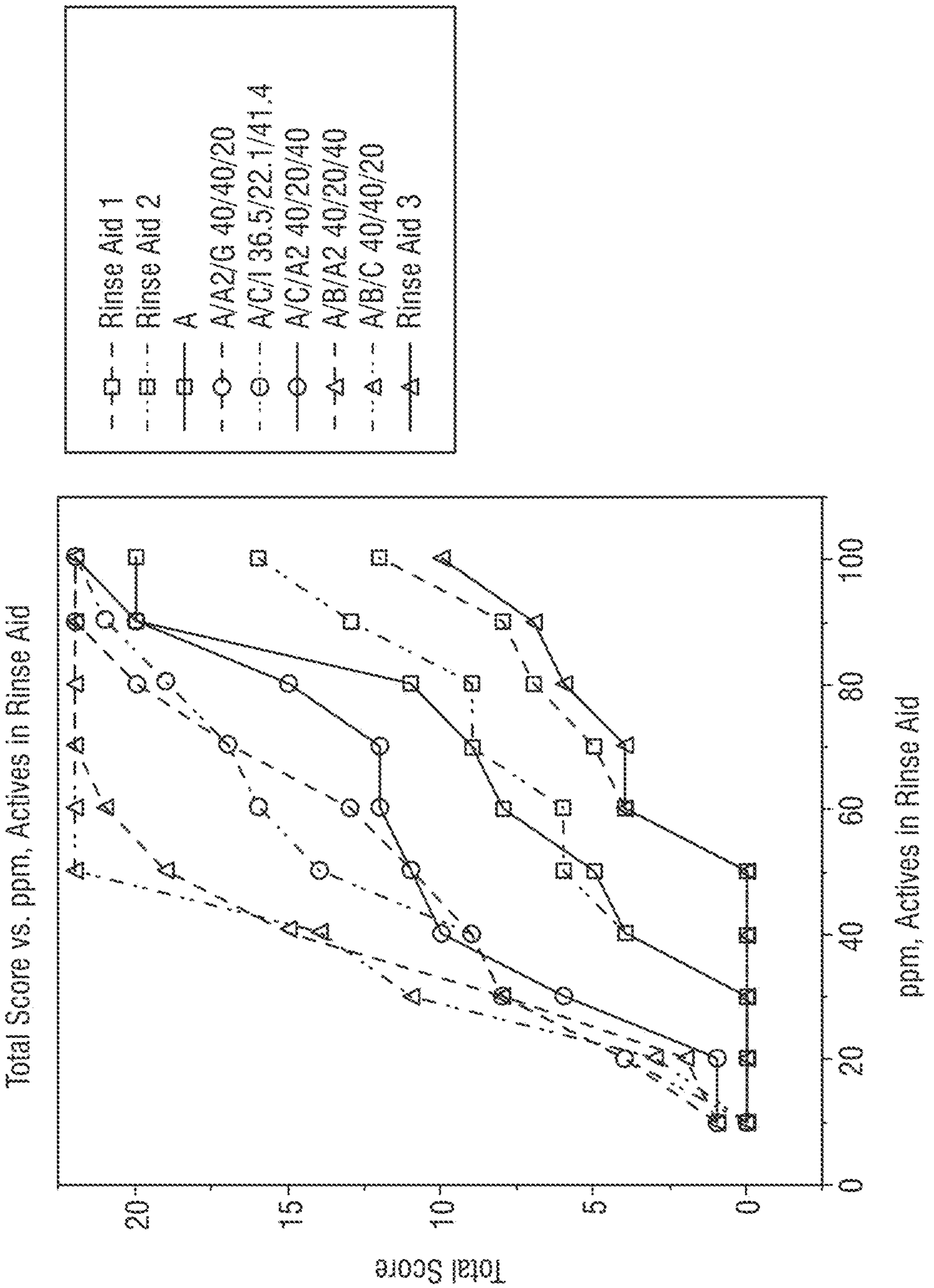
FIG. 4 shows a graphical representation of the data in Tables 12-19 from Example 5 depicting the sheeting capability of surfactant systems according to embodiments of the invention.

The cumulative results shown in Tables 12-19 are also depicted in FIG. 4 in chart format showing all sheeting data together. The graph is generated by apportioning a numerical value for the results of Tables 12-19 (providing a total score or "sum" of the results). The steeper the line for each system indicates there was faster and complete sheeting achieved. The surfactant system A/B/C (40/40/20 ratio) is depicted as the highest performer.

Example 6

Figure 5:
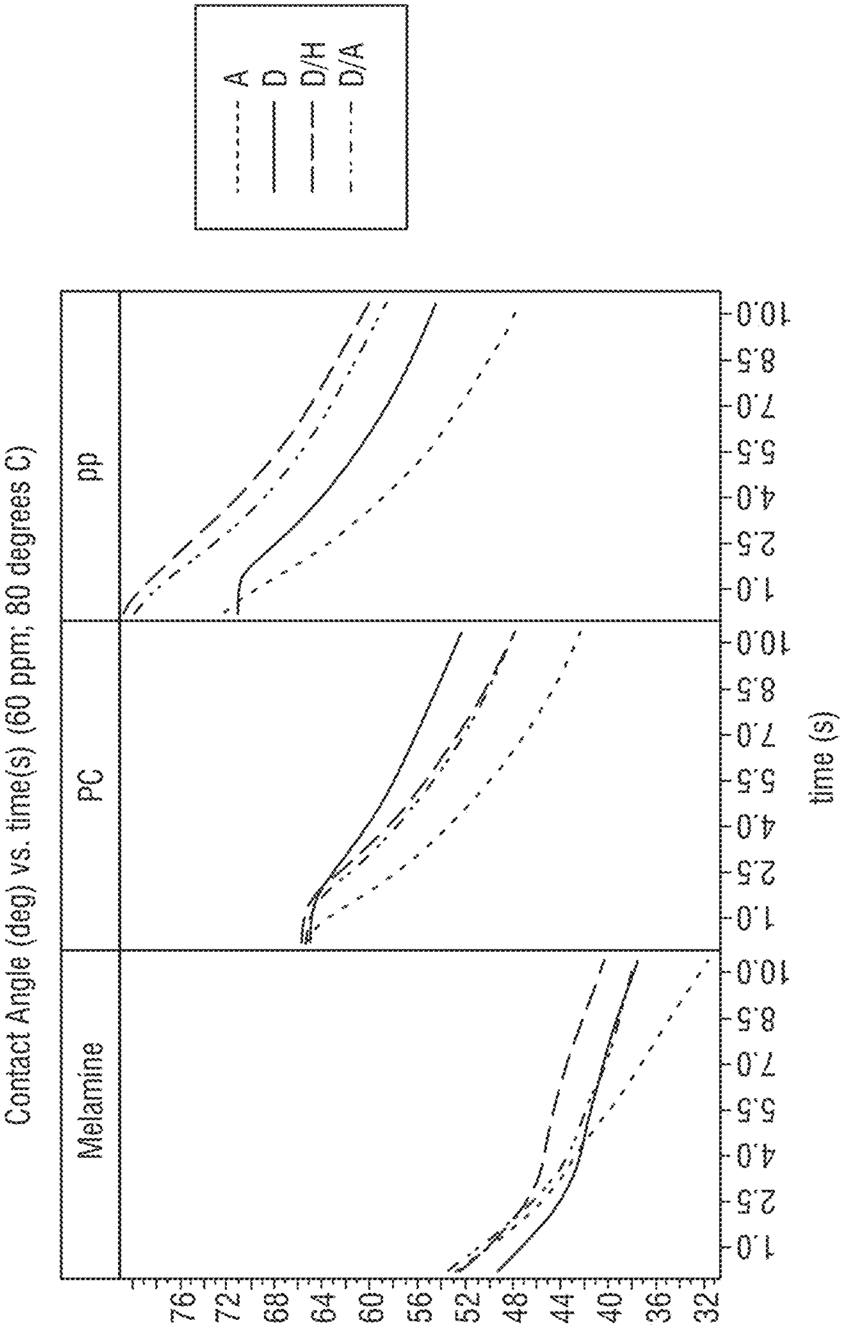
FIGS. 5-7 show the results of Example 6 where the surfactant systems were evaluated for dynamic contact angle showing wetting on various substrate surfaces.
Figure 6:
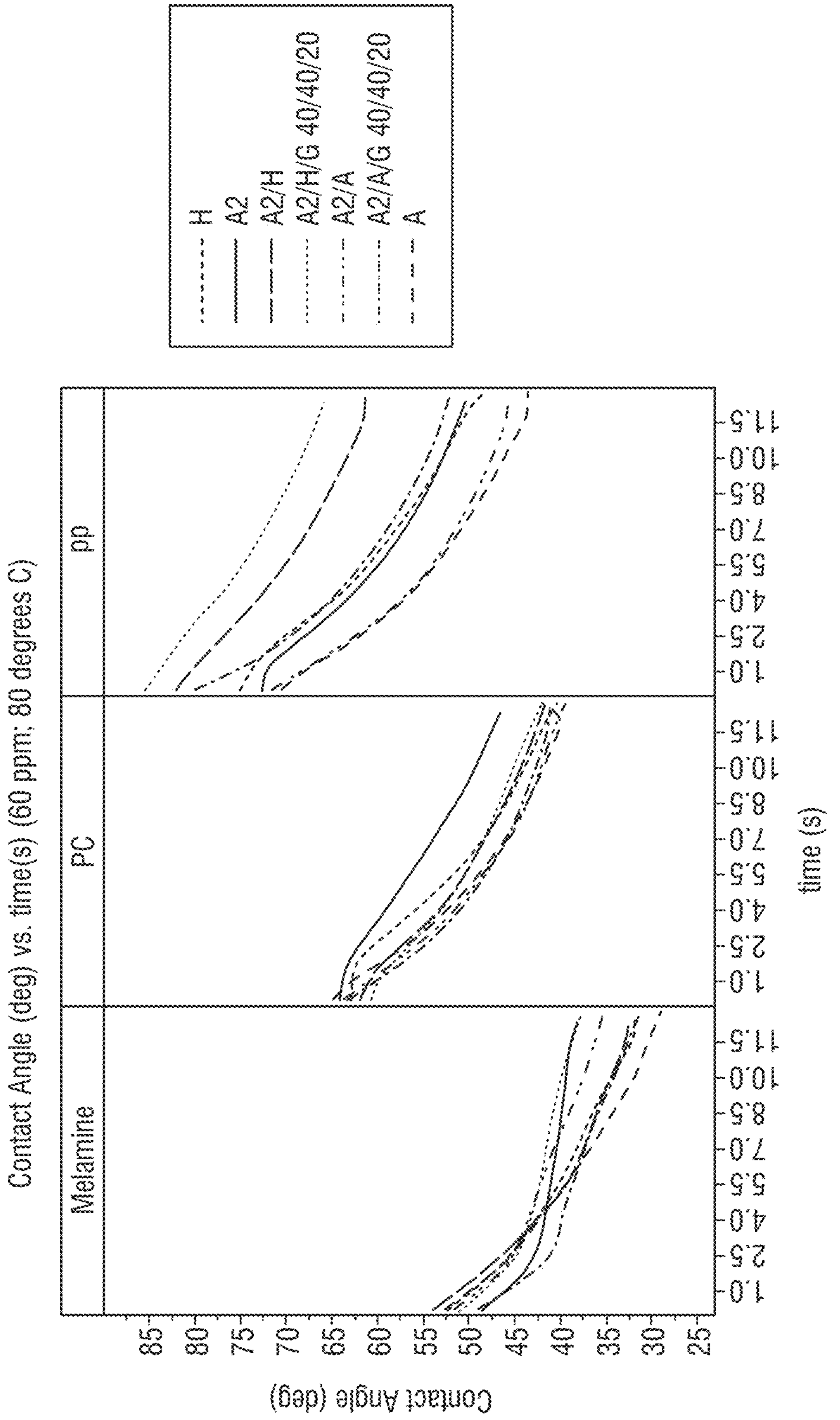
Figure 7:
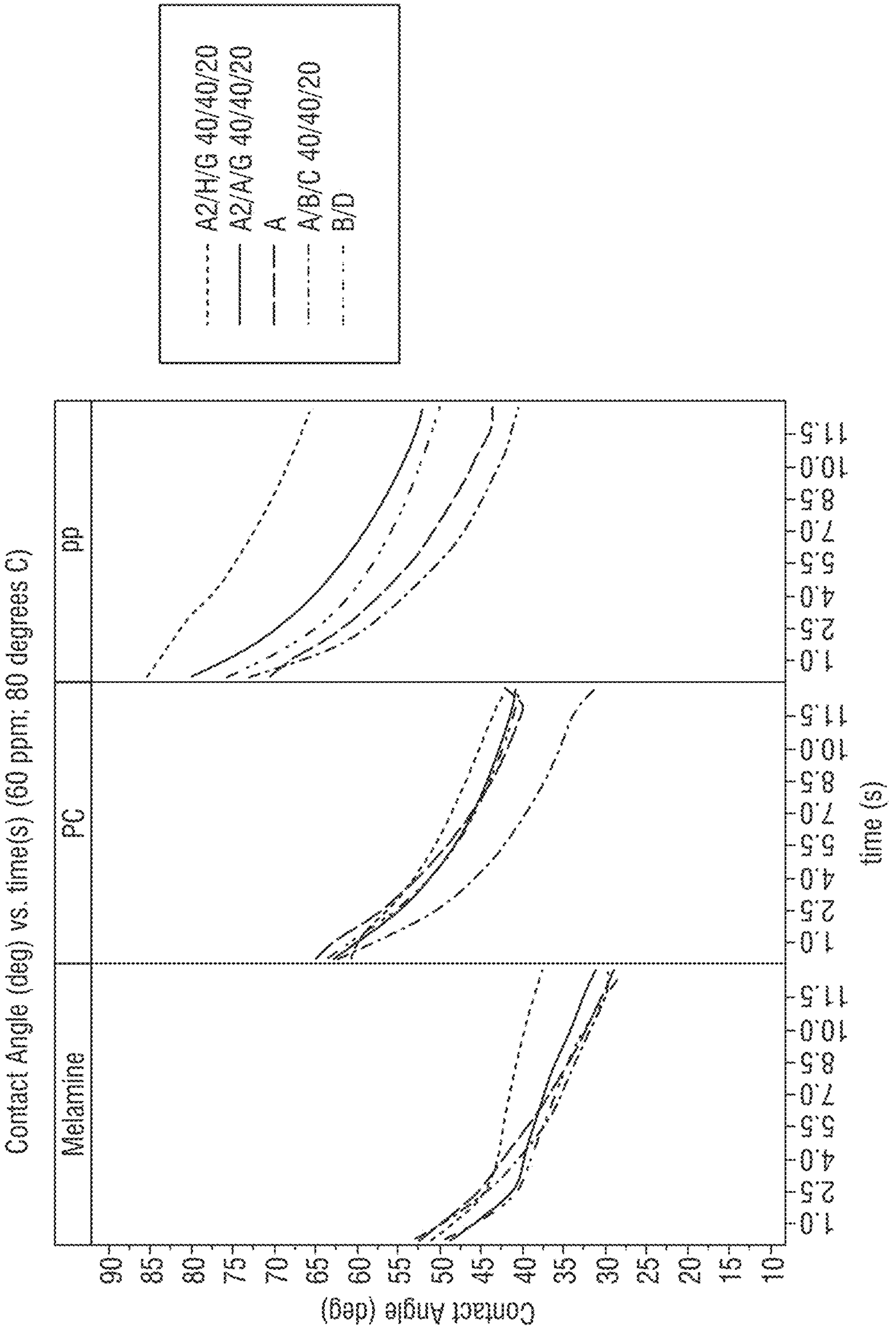

These variations of surfactant systems tested in Example 5 were further evaluated using the dynamic contact angle as set forth in Example 3. FIGS. 5-7 show the contact angle versus time (dynamic contact) as done with the sheeting study. The figures confirm the most preferred embodiment of the surfactant system is the surfactant system A/B/C (40/40/20 ratio).

Example 7

50 Cycle Redesposition Evaluation. The results of Examples 5-6 with preferred surfactant systems were placed into two inline formulations at the same surfactant level as the inline surfactant package. The inline products were evaluated for performance versus the experimental formulations in a 50 cycle test.

6 Glasses were placed in a rack in a diagonal line along with one plastic glass. The machine was charged with 0.08% (800 ppm) detergent and the desired volume (mls) for each individual rinse aid. The detergent remained constant for each rinse aid evaluated. A concentration of 0.2% (2000 ppm) food soil was added to the machine (accounting for volume of sump). When the test started the detergent and rinse aid dispensers automatically dosed the proper amount each cycle. The detergent was controlled by conductivity and the rinse aid was dispensed in milliliters per rack. The food soil was hand dosed for each cycle to maintain 0.2% (2000 ppm) concentration. When the test was finished the glasses are allowed to dry overnight and evaluated for film accumulation. Glasses were then stained with coomassie blue to determine protein residue.

Figure 8:
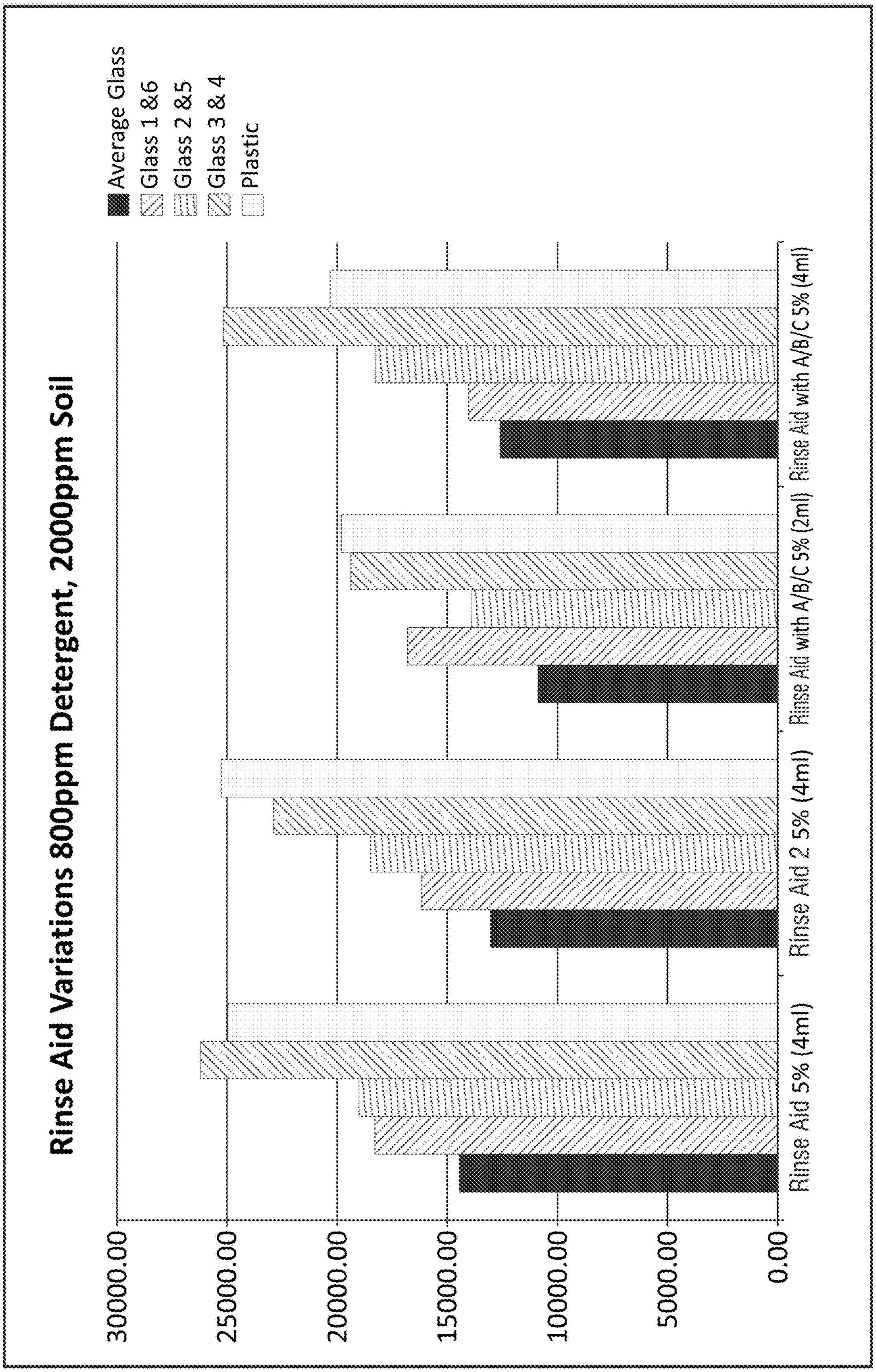
FIG. 8 shows the results of the 50 cycle test of Example 7 where the average scores for the glasses tested show benefits on sheeting and drying using the surfactant systems according to embodiments of the invention.
Figure 9:
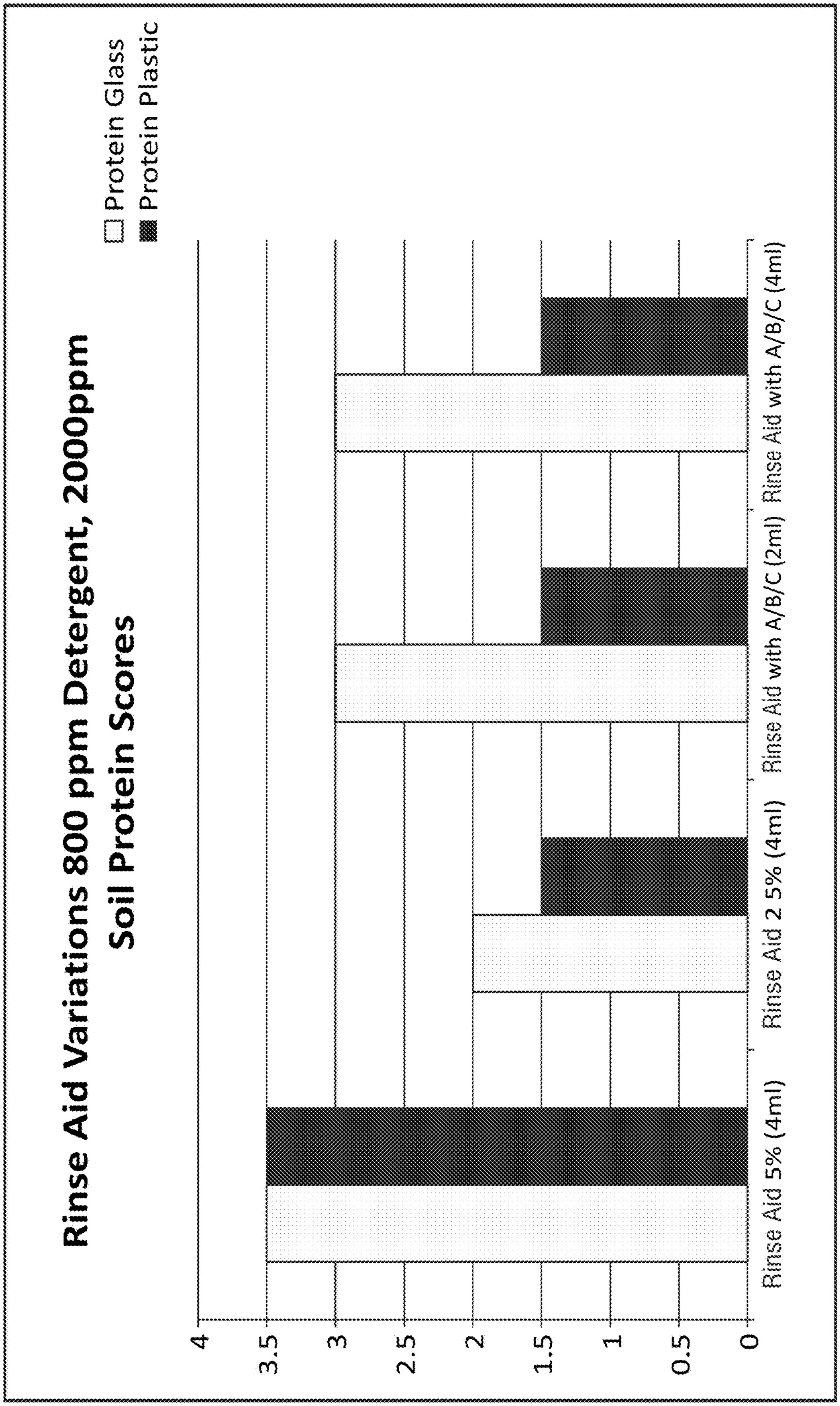
FIG. 9 shows additional results of the 50 cycle test of Example 7 where the redeposition protein scores for the glasses tested show benefits of using the surfactant systems according to embodiments of the invention.

The results are shown in FIGS. 8-9. FIG. 8 shows the average glass score and the plastic glass score, along with the change in results depending on the placement of the glasses in the rack. The performance data shows that the average glass score and the plastic score is much improved using the commercially available rinse aid with the surfactant system A/B/C at the 40/40/20 ratio using the same surfactant percentage in both the inline and the experimental formulations. Unexpectedly, the formulation is more effective at a 2 ml dose then the other formulas at a 4 ml dose, indicative of the synergy obtained from the combination allowing dosing at lower actives level while provide at least substantially similar performance, or as depicted in FIG. 8 having improved performance.

FIG. 9 shows the redeposition protein scores achieved using the preferred surfactant system A/B/C at the 40/40/20 ratio used in the commercial rinse aid A/B/C formulation, demonstrating improved results on protein redeposition in comparison to the inline commercial rinse aid. Although the surfactant system provided for rinse aid benefits is not alone responsible for protein removal, the sheeting of the rinse aid prevents redepositing on the ware from the soil load in the sump of the dishmachine demonstrating further benefit of the present invention.

Example 8

Variations of surfactants were evaluated specifically for high temperature warewashing (80 C) according to embodiments of the invention. Utilizings the methods described in Examples 1, 2 and 3, foam, sheeting and dynamic contact angle were determined respectively. Combinations of surfactants are described in Table 20.

TABLE 20

| | First Composition | Second Composition | Third Composition |
|---|---|---|---|
| Surfactant A | 40 | 0 | 38 |
| Surfactant A2 | 0 | 40 | 0 |
| Surfactant B | 40 | 40 | 38 |
| Surfactant C | 20 | 20 | 0 |
| Surfactant D | | | 24 |

The results depicted in Table 21 show foam results by the method described in Example 1.

TABLE 21

| Surfactant Combination | (° F.) | initial | 15 sec | 1 min | initial | 15 sec | 1 min |
|---|---|---|---|---|---|---|---|
| A/B/C (40/40/20) | 140 | 1½ | ¾ | ½ | 5 | 2¼ | 1¼ |
| A2/B/C (40/40/20) | 140 | 1½ | ½ | ½ | 5 | 2 | 1⅜ |
| A/B/D (38/38/24) | 140 | 1 | ¼ | ⅛ | 5½ | 3½ | ½ |

Figure 10:
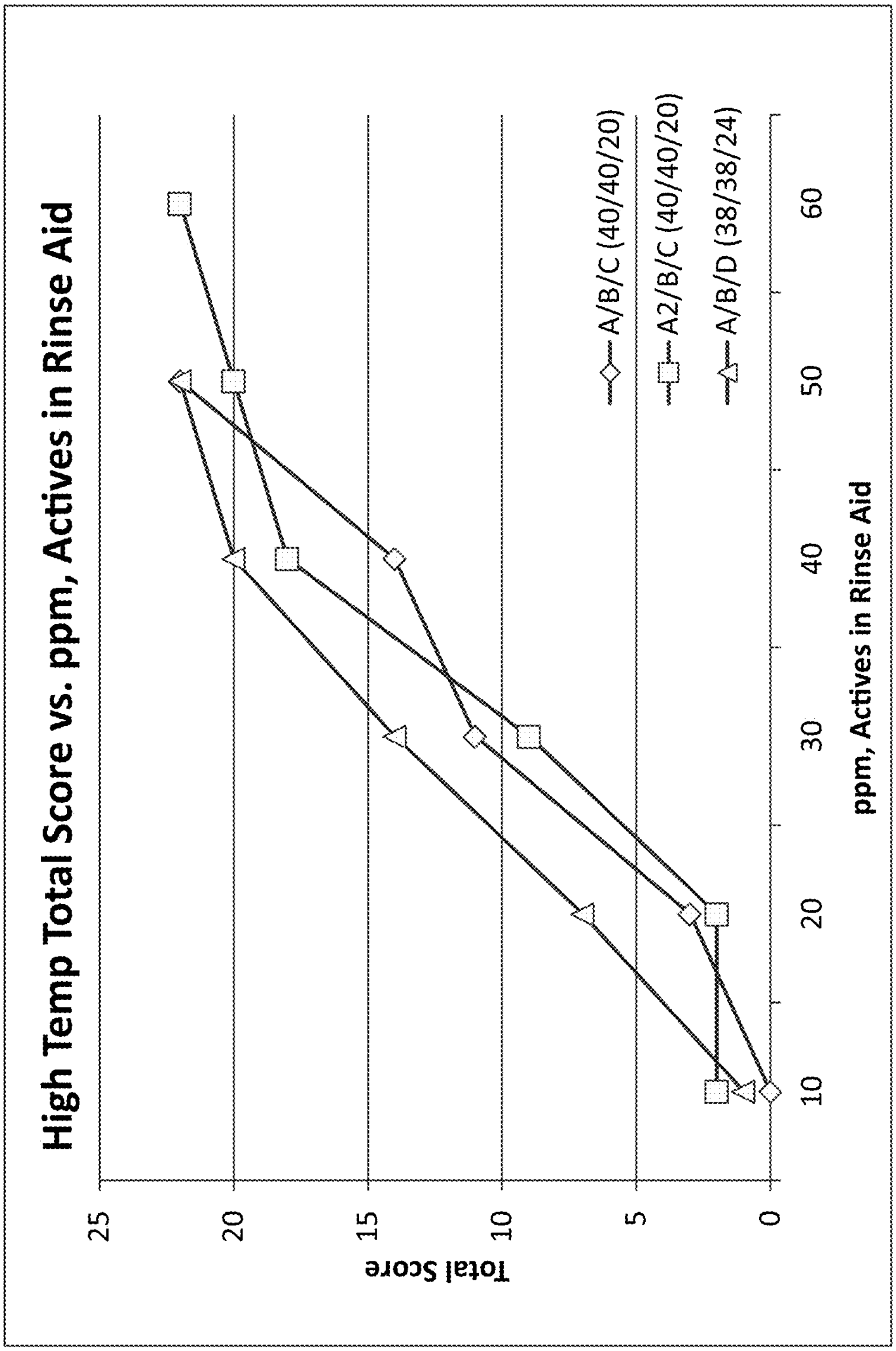
FIG. 10 shows evaluation of surfactant systems in high temperature warewashing systems according to embodiments of the invention.

FIG. 10 is a summary of sheeting scores as a result of the method described in Example 2.

The results in Table 22 show a summary of contact angle as a result of the method described in Example 3. Exemplary contact angle is depicted at approximately 9 seconds after initial contact with the surface, using 60 ppm active surfactant at 80 C.

TABLE 22

| Surfactant Combination | Mean Time (seconds) | Melamine | Polycarbonate | Polypropylene |
|---|---|---|---|---|
| A/B/C (40/40/20) | 9.10 | 17.00 | 36.30 | 44.10 |
| A2/B/C (40/40/20) | 9.06 | 15.20 | 34.87 | 40.45 |
| A/B/D (38/38/24) | 9.04 | 27.38 | 41.52 | 47.75 |

Example 9

Variations of surfactants were evaluated specifically for low temperature warewashing (50 C) according to embodiments of the invention. Utilizings the methods described in Examples 1, 2 and 3, foam, sheeting and dynamic contact angle were determined respectively. Combinations of surfactants are described in Table 23.

TABLE 23

| | First Composition | Second Composition | Third Composition | Fourth Composition |
|---|---|---|---|---|
| Surfactant A | 38 | 0 | 15 | 32 |
| Surfactant A2 | 0 | 38 | 0 | |
| Surfactant B | 38 | 38 | 15 | 32 |
| Surfactant C | 0 | 0 | 0 | 16 |
| Surfactant D | 24 | 24 | 70 | 20 |

The results depicted in Table 24 show low temperature foam results by the method described in Example 1.

TABLE 24

| Surfactant | Temp | after 1 min run time (inches) | | | after 5 (total) minutes run time | | |
|---|---|---|---|---|---|---|---|
| Combination | (° F.) | initial | 15 sec | 1 min | initial | 15 sec | 1 min |
| A/B/D (38/38/24) | 120 | 2 | ¾ | ½ | 4 | 1½ | ¾ |
| A2/B/D (38/38/24) | 120 | 1¾ | ⅜ | ½ | 4 | ½ | ⅜ |
| A/B/D (15/15/70) | 120 | 0 | 0 | 0 | ¾ | 0 | 0 |
| A/B/C/D (32/32/16/20) | 120 | 2.5 | ¾ | ¼ | 6¾ | 2¾ | ¾ |

Figure 11:
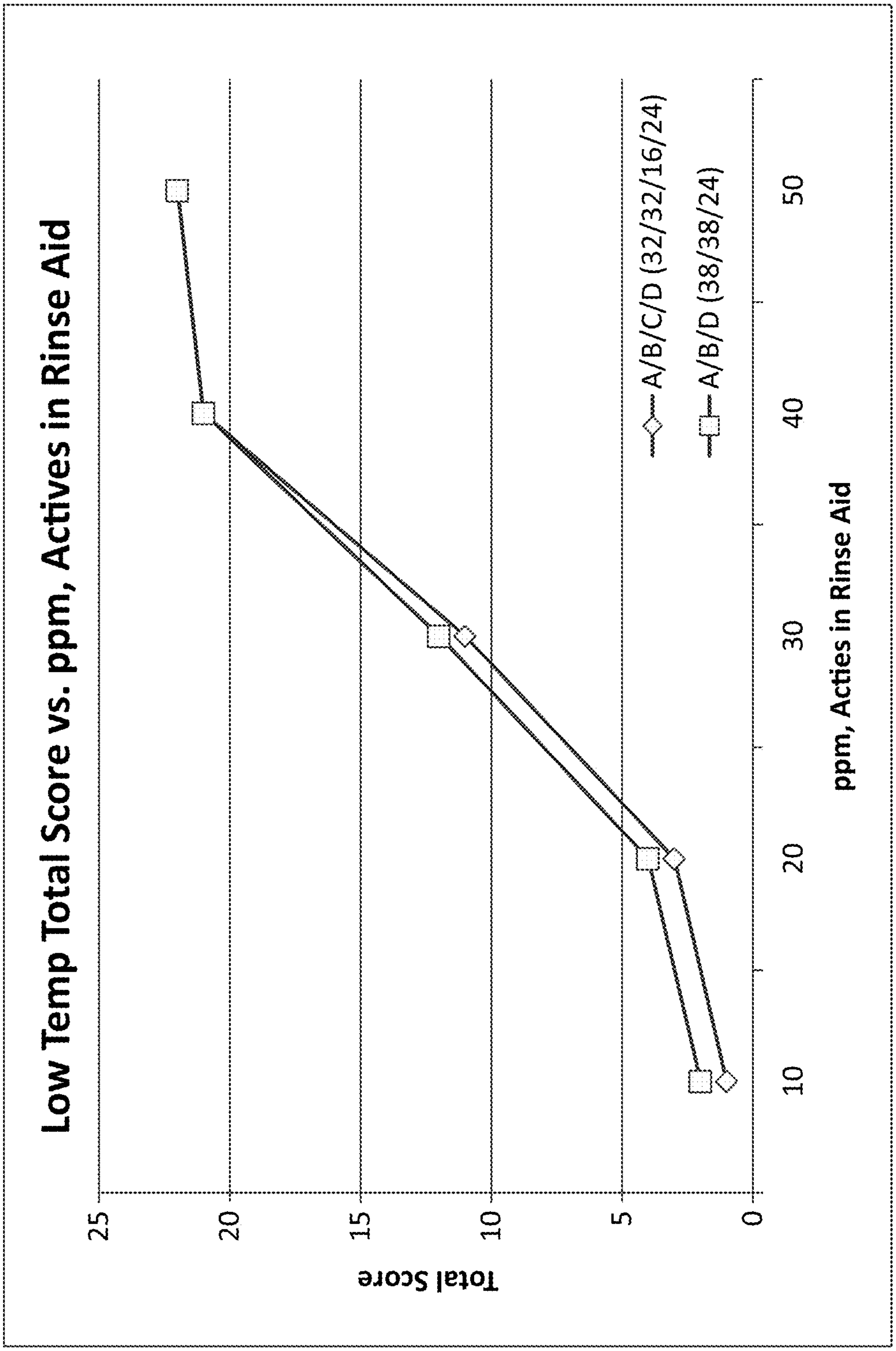
FIG. 11 shows evaluation of surfactant systems in low temperature warewashing systems according to embodiments of the invention.

FIG. 11 is a summary of sheeting scores as a result of the method described in Example 2.

The results in Table 25 show a summary of contact angle as a result of the method described in example 3. Exemplary contact angle is depicted at approximately 9 seconds after initial contact with the surface, using 60 ppm active surfactant at 50 C.

TABLE 25

| Surfactant Combination | Mean Time | Melamine | Polycarbonate | Polypropylene |
|---|---|---|---|---|
| A/B/D (38/38/24) | 9.05 | 36.75 | 45.73 | 53.45 |
| A2/B/D (38/38/24) | 9.04 | 34.20 | 44.08 | 57.57 |
| A/B/D (15/15/70) | 9.04 | 37.70 | 49.23 | 68.23 |
| A/B/C/D (32/32/16/20) | 9.04 | 24.94 | 38.26 | 48.60 |

Example 10

Further evaluation of surfactant combinations for solid formulation according to embodiments of the invention was conducted utilizing the methods described in Examples 1, 2 and 3 where foam, sheeting and dynamic contact angle were determined respectively. Combinations of surfactants are described in Table 26.

TABLE 26

| Surfactant Combination | First Composition | Second Composition | Third Composition |
|---|---|---|---|
| Surfactant A | 25 | 30 | 30 |
| Surfactant B | 25 | 30 | 0 |
| Surfactant D | 0 | 0 | 30 |
| Surfactant G | 50 | 40 | 40 |

The results depicted in Table 27 show low temperature foam results by the method described in Example 1.

TABLE 27

| Surfactant | Temp | after 1 min run time (inches) | | | after 5 (total) minutes run time | | |
|---|---|---|---|---|---|---|---|
| Combination | (° F.) | initial | 15 sec | 1 min | initial | 15 sec | 1 min |
| A/B/G (25/25/50) | 140 | 3 | 1½ | ¾ | 9 | 8 | 7 |
| A/B/G (30/30/40 | 140 | 1¾ | ½ | ¼ | 6 | 4½ | 2¼ |
| A/D/G (30/30/40 | 140 | ½ | >1/16 | >1/16 | 3¼ | ½ | ¼ |

Table 28 is a summary of sheeting scores as a result of the method described in Example 2.

TABLE 28

| (25% A/25% B/ 50% G; 0 grain; 66° C. (150° F.)). | | |
|---|---|---|
| ppm, Actives in Rinse Aid | 10 | 20 |
| Glass tumbler | 2 | 2 |
| China Plate | 2 | 2 |
| Melamine Plate | 2 | 2 |
| Polypropylene Cup (yellow) | 1 | 2 |
| Dinex Bowl (blue) | 2 | 2 |
| Polypropylene Jug (blue) | 2 | 2 |
| Polysulfonate Dish (clear tan) | 2 | 2 |
| Stainless Steel Knife | 2 | 2 |
| Polypropylene tray (peach) | 1 | 2 |
| Fiberglass tray (tan) | 2 | 2 |

TABLE 28-continued

| (25% A/25% B/ 50% G; 0 grain; 66° C. (150° F.)). | | |
|---|---|---|
| ppm, Actives in Rinse Aid | 10 | 20 |
| Stainless steel slide 316 | 2 | 2 |
| Suds | 0.25" stable foam | |

The results in Table 29 show a summary of contact angle as a result of the method described in Example 3. Exemplary contact angle is depicted at approximately 9 seconds after initial contact with the surface, using 60 ppm active surfactant at 50° C.

TABLE 29

| Surfactant Combination | Mean Time | Melamine | Polycarbonate | Polypropylene |
|---|---|---|---|---|
| A/D/G (30/30/40) | 9.04 | 35.3 | 45.4 | 54.9 |

Example 11

Further evaluation of surfactant systems was compared to Glassware, Flatware and Plate Ratings in commercial warewash applications compared to commercially-available rinse aid controls. The objective of the trial was to evaluate surfactant systems in comparison to positive controls aimed to obtain equal (at lower actives) or better performance, as determined by ware ratings and dry times. The additional benefit of reduced cost surfactant systems was also measured.

Rinse aid testing occurred at 10 distinct locations evenly split between high temperature (>180° F. rinse, hot water sanitizing) and low temperature (<180° F. rinse, chemical sanitizing) dish machines. The positive controls were each commercially-available rinse aids. The following information was collected during the 45 day baseline and 45 day test phase: Glassware appearance ratings (overall, spot, film) (scale of 1 to 5) according to Table 30.

TABLE 30

| Grade | Spots | Film | Protein |
|---|---|---|---|
| 1 | No spots | No film | No Protein |
| 2 | Random amount of spots. There are spots but they cover less than ¼ of the glass surface. | Trace amount of film. This is a barely perceptible amount of film that is barely visible under intense spot light conditions, but is not noticeable if the glass is held up to a florescent light source. | Light amount of protein. After dyeing glass with Coomassie blue reagent, the glass is covered with a light amount of blue. A trace amount of blue is a grade of 1.5. Protein film is not readily visible to the eye unless dyed. |

TABLE 30-continued

| Grade | Spots | Film | Protein |
|---|---|---|---|
| 3 | ¼ of the glass surface is covered with spots. | A slight of film is present. The glass appears slightly filmed when held up to a florescent light source. | A medium amount of protein film is present. |
| 4 | ½ of the glass surface is covered with spots | A moderate amount of film is present. The glass appears hazy when held up to a florescent light source. | A heavy amount of protein is present. |
| 5 | The entire surface of the glass is coated with spots. | A heavy amount of filming is present. The glass appears cloudy when held up to a florescent light source. | A very heavy amount of protein is present. A Coomassie dyed glass will appear dark blue. |

Figure 12:
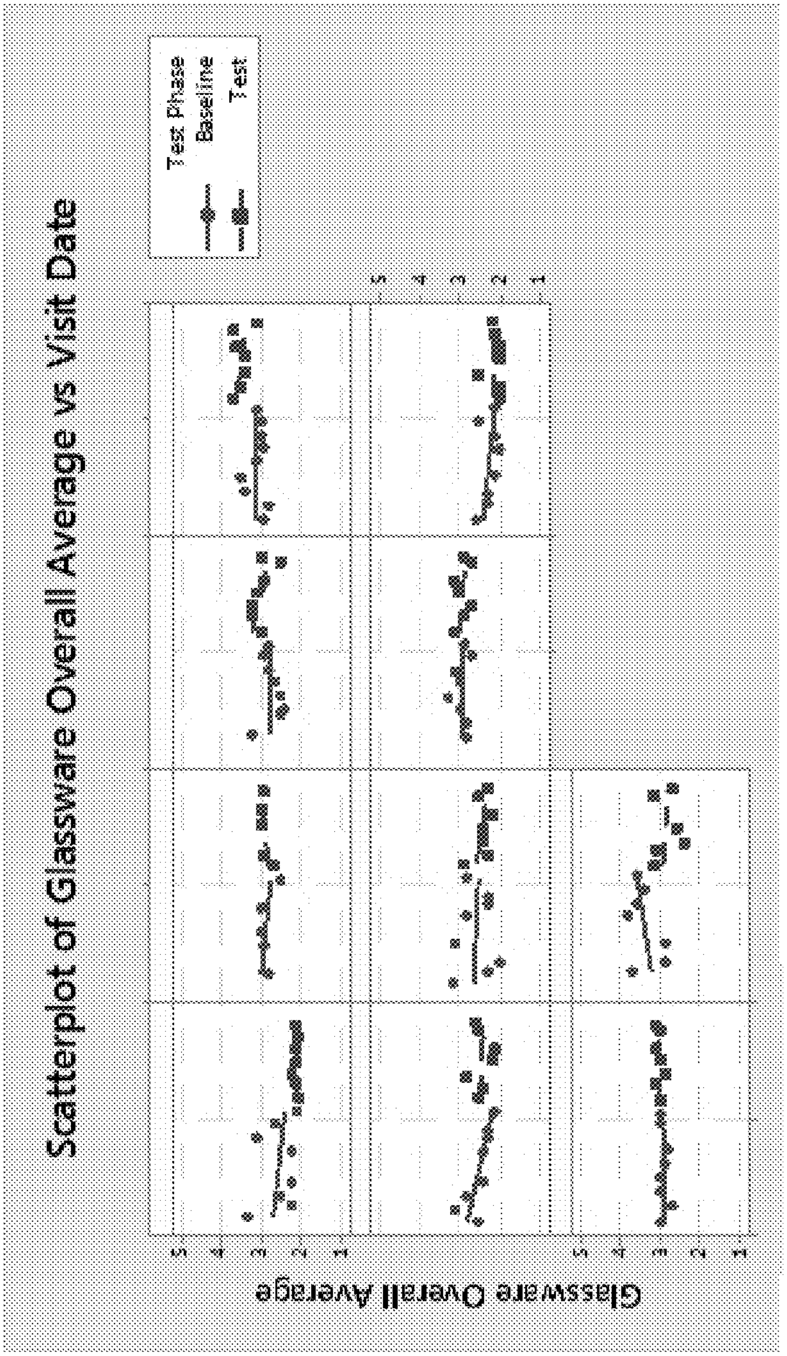
FIG. 12 shows a scatterplot of glassware ratings over various time plots at 10 locations employing a baseline conventional rinse aid and the test formulation employing a surfactant system according to embodiments of the invention.

The rinse aid delivery volumes were consistent at all locations. FIG. 12 shows a scatterplot of the baseline (positive control) and test (surfactant system A/B/D 38/38/24). Beneficially, according to the results of the testing, as shown in FIG. 12, the surfactant systems according to the invention provided at least the same efficacy (at approximately 50% lower actives) than the positive control.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A method of rinsing a surface comprising:

applying a rinse aid composition to a ware in need of rinsing;

wherein the rinse aid composition comprises a surfactant system comprising:

(i) at least two surfactants according to the following formulas:

$R^1$—O-$(EO)_{x3}(PO)_{y3}$—H (A)

wherein $R^1$ is a straight-chain $C_{10}$-$C_{16}$ alkyl, wherein $x_3$ is from 5 to 8, and wherein $y_3$ is from 2 to 5, $R^1$—O-$(EO)_{x4}(PO)_{y4}$—H (A2)

wherein $R^1$ is a straight-chain $C_{10}$-$C_{16}$ alkyl, wherein $x_4$ is from 4 to 6, and wherein $y_4$ is from 3 to 5, $R^2$—O-$(EO)_{x1}$—H (B)

wherein $R^2$ is a $C_{10}$-$C_{14}$ alkyl with an average of at least 2 branches per residue, and wherein $x_1$ is from 5 to 10, $R^7$—O—$(PO)_{y5}(EO)_{x5}(PO)_{y6}$—H (D)

wherein $R^7$ is a branched $C_8$-$C_{16}$ Guerbet alcohol, $x_5$ is from 5 to 30, $y_5$ is from 1 to 4, and $y_6$ is from 10 to 20,

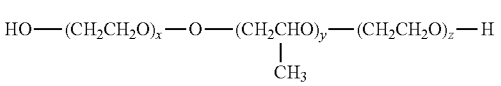

(G)

wherein x is from 88 to 108, y is from 57 to 77, and z is from 88 to 108, and

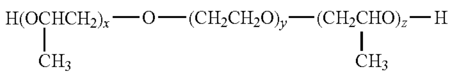

(H)

wherein x is from 15 to 25, y is from 10 to 25, and z is from 15 to 25; and (ii) optionally an additional surfactant according to the following formulas:

$R^2$—O-$(EO)_{x2}$—H (C)

wherein $R^2$ is a $C_{10}$-$C_{14}$ alkyl with an average of at least 2 branches per residue, and wherein $x_2$ is from 2 to 4, $R^6$—O—$(PO)_{y4}(EO)_{x4}$—H (E)

wherein $R^6$ is a $C_8$-$C_{16}$ Guerbet alcohol, wherein $x_4$ is from 2 to 10, and wherein $y_4$ is

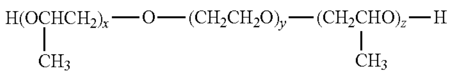

(F)

wherein x is from 12 to 20, y is from 120 to 220, and z is from 12 to 20.

2. The method of claim 1, wherein the rinse aid composition further comprises an additional functional ingredient.

3. The method of claim 2, wherein the additional functional ingredient is an additional functional ingredient is a solidification aid, carrier, chelating agent, bleaching agent, sanitizer, defoaming agent, anti-redeposition agent, optical brightener, dye, odorant, stabilizing agent, dispersant, enzyme, corrosion inhibitor, thickener, solubility modifier, or a combination thereof.

4. The method of claim 1, wherein the surfactant system comprises surfactant (A) or surfactant (A2), and surfactant (B), and optionally surfactant (C).

5. The method of claim 1, wherein the surfactant system comprises surfactant (A), surfactant (B), and surfactant (D), or wherein the surfactant system comprises surfactant (A2), surfactant (B), and surfactant (D).

6. The method of claim 1, wherein the surfactant system comprises surfactant (H) or surfactant (D), and surfactant (G), and optionally surfactant (A).

7. The method of claim 1, wherein the surfactant system comprises surfactant (B) and surfactant (D), and optionally surfactant (F).

8. The method of claim 1, wherein the surfactant system comprises surfactant (A) or surfactant (A2), and surfactant (D) or surfactant (H).

9. The method of claim 1, wherein the rinse aid composition is a liquid concentrate or a solid.

10. The method of claim 9, wherein the rinse aid composition is a pressed solid or an extruded solid.

11. The method of claim 1, further comprising a first step of contacting the rinse aid composition with water to dilute the rinse aid composition.

12. The method of claim 11, wherein the rinse aid composition diluted with water has a pH of about 8.5 or below.

13. The method of claim 11, wherein the rinse aid composition diluted with water has about 1 ppm to about 125 ppm of the surfactant system.

14. The method of claim 1, further comprising a step of reducing the contact angle of the surfactant system composition by at least about 5° compared to the contact angle of a commercially-available rinse aid composition to induce sheeting and result in a faster drying time of the surface.

15. The method of claim 1, wherein the method is used in a warewashing system.

16. The method of claim 15, wherein the warewashing system includes one or more rinse cycles in a commercial warewashing machine.

17. The method of claim 15, wherein the one or more rinse cycles include a hot water sanitizing rinse cycle, a chemical sanitizing rinse cycle, or a combination thereof.

18. The method of claim 15, wherein the warewashing system is a low temperature warewash system, and wherein the method is performed at a temperature of 140° F. or less.

19. The method of claim 1, wherein the ware is a cookware, dishware, flatware, glass, cups a hard ware surface, glass ware surface, plastic ware surface, or a combination thereof.

20. The method of claim 1, wherein the method reduces spotting and filming on the ware.

* * * * *